United States Patent
O

(10) Patent No.: US 11,474,950 B2
(45) Date of Patent: Oct. 18, 2022

(54) MEMORY CONTROLLER INCLUDING PLURALITY OF ADDRESS MAPPING TABLES, SYSTEM ON CHIP, AND ELECTRONIC DEVICE

(71) Applicant: SAMSUNG ELECTRONICS CO., LTD., Suwon-si (KR)

(72) Inventor: Seongil O, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/995,935

(22) Filed: Aug. 18, 2020

(65) Prior Publication Data
US 2021/0224195 A1  Jul. 22, 2021

(30) Foreign Application Priority Data

Jan. 16, 2020 (KR) .................. 10-2020-0005882

(51) Int. Cl.
*G06F 12/1009* (2016.01)
*G06F 12/0895* (2016.01)

(52) U.S. Cl.
CPC ...... *G06F 12/1009* (2013.01); *G06F 12/0895* (2013.01); *G06F 2212/608* (2013.01); *G06F 2212/657* (2013.01)

(58) Field of Classification Search
CPC ............ G06F 12/0207; G06F 12/1009; G06F 2212/7208; G06F 12/0895; G06F 2212/608; G06F 2212/657; H01L 25/0657
See application file for complete search history.

(56) References Cited

U.S. PATENT DOCUMENTS

| | | |
|---|---|---|
| 6,505,269 B1 | 1/2003 | Potter |
| 8,135,936 B2 | 3/2012 | Schaefer et al. |
| 10,338,837 B1 | 7/2019 | De et al. |
| 10,409,500 B2 | 9/2019 | Trika et al. |
| 11,175,984 B1 * | 11/2021 | Lercari ............... G06F 11/0784 |
| 2010/0235564 A1 | 9/2010 | Ito |
| 2015/0089183 A1 * | 3/2015 | Bains .................. G06F 12/0292 711/202 |
| 2020/0105722 A1 * | 4/2020 | Sethuraman ............ G06F 12/10 |

FOREIGN PATENT DOCUMENTS

| | | |
|---|---|---|
| JP | 2005209058 A | 8/2005 |
| JP | 4992114 B2 | 8/2012 |

* cited by examiner

*Primary Examiner* — Gary W. Cygiel
(74) *Attorney, Agent, or Firm* — Sughrue Mion, PLLC

(57) ABSTRACT

A memory controller includes a memory request queue that stores a memory request associated with a memory device including the first memory die and the second memory die having a shared channel, an address converter that selects one of first and second address mapping tables for the first memory die and the second memory die based on a bit of a physical address of the memory request and converts the physical address into a memory address based on the selected address mapping table and a physical layer that transmits the memory address to the memory device through the channel.

21 Claims, 15 Drawing Sheets

FIG. 13

Vector A │ T_BK (BK0, BK2, ⋯, BK14) │
         +
Vector B │ B_BK (BK1, BK3, ⋯, BK15) │
         =
Vector C │ REG (PE0, PE1, ⋯, PE7) │

MEMORY CONTROLLER INCLUDING PLURALITY OF ADDRESS MAPPING TABLES, SYSTEM ON CHIP, AND ELECTRONIC DEVICE

CROSS-REFERENCE TO THE RELATED APPLICATIONS

This application is based on and claims priority under 35 U.S.C. § 119 to Korean Patent Application No. 10-2020-0005882 filed on Jan. 16, 2020, in the Korean Intellectual Property Office, the disclosures of which are incorporated by reference herein in their entireties.

BACKGROUND

The inventive concept relates to a memory controller, a system on chip, and an electronic device capable of storing a plurality of address mapping tables.

Recently, a plurality of semiconductor dies are stacked to increase the degree of integration of a memory device. As such, a memory device of a three-dimensional structure may process a large amount of data at a high speed. To implement the three-dimensional structure, a through silicon via (TVS) may be used to stack a plurality of semiconductor dies. However, even though a data processing speed increases, the separation of a processor from a memory causes a latency of data that are transmitted between the processor and the memory. To solve this issue, a processing in memory (PIM) in which the processor and the memory are integrated is on the spotlight.

SUMMARY

Embodiments of the inventive concept provide a memory controller, a system on chip, and an electronic device capable of storing a plurality of address mapping tables.

According to an exemplary aspect of the disclosure, there is provided a memory controller comprising: a memory request queue configured to store a memory request associated with a memory device including a first memory die and a second memory die having a shared channel; an address converter configured to select one of a first address mapping table and a second address mapping table based on a bit of a physical address of the memory request and to convert the physical address into a memory address for the first memory die and the second memory die based on the selected one of the first address mapping table and the second address mapping table; and a physical layer configured to transmit the memory address to the memory device through the shared channel.

According to another exemplary aspect of the disclosure, there is provided a system on chip comprising: a processor configured to generate a memory request; and a memory controller configured to: select one of a first address mapping table and a second address mapping table based on a bit of a physical address of the memory request; convert the physical address into a memory address of a memory device based on the selected one of the first address mapping table and the second address mapping table; and access one of a first memory die or a second memory die through a shared channel based on the memory address.

According to another exemplary aspect of the disclosure, there is provided an electronic device comprising: a memory device comprising a first memory die, a second memory die, and a shared channel for the first memory die and the second memory die; and a system on chip comprising: a processor configured to generate a memory request; and a memory controller configured to: select one of a first address mapping table and a second address mapping table based on a bit of a physical address of the memory request, convert the physical address into a memory address of the memory device based on the selected one of the first address mapping table and the second address mapping table, and access one of the first memory die and the second memory die through the shared channel based on the memory address.

According to another exemplary aspect of the disclosure, there is provided an address converter circuit comprising: an address range register configured to store a bit of a physical address of a memory request; a plurality of address converting circuits, each of the plurality of address converting circuits configured to convert the physical address into a memory address based on one of a plurality of address mapping tables; and a mapping selecting circuit configured to select one of the plurality of address converting circuits based on a value of the bit stored in the address range register.

BRIEF DESCRIPTION OF THE FIGURES

The above and other aspects, objects and features of the inventive concept of the disclosure will become apparent from the illustration in the detail exemplary embodiments thereof with reference to the accompanying drawings.

FIG. 13 illustrates an example of calculations executed by PEs according to data arrangement of FIG. 12.

DETAILED DESCRIPTION

Figure 1:
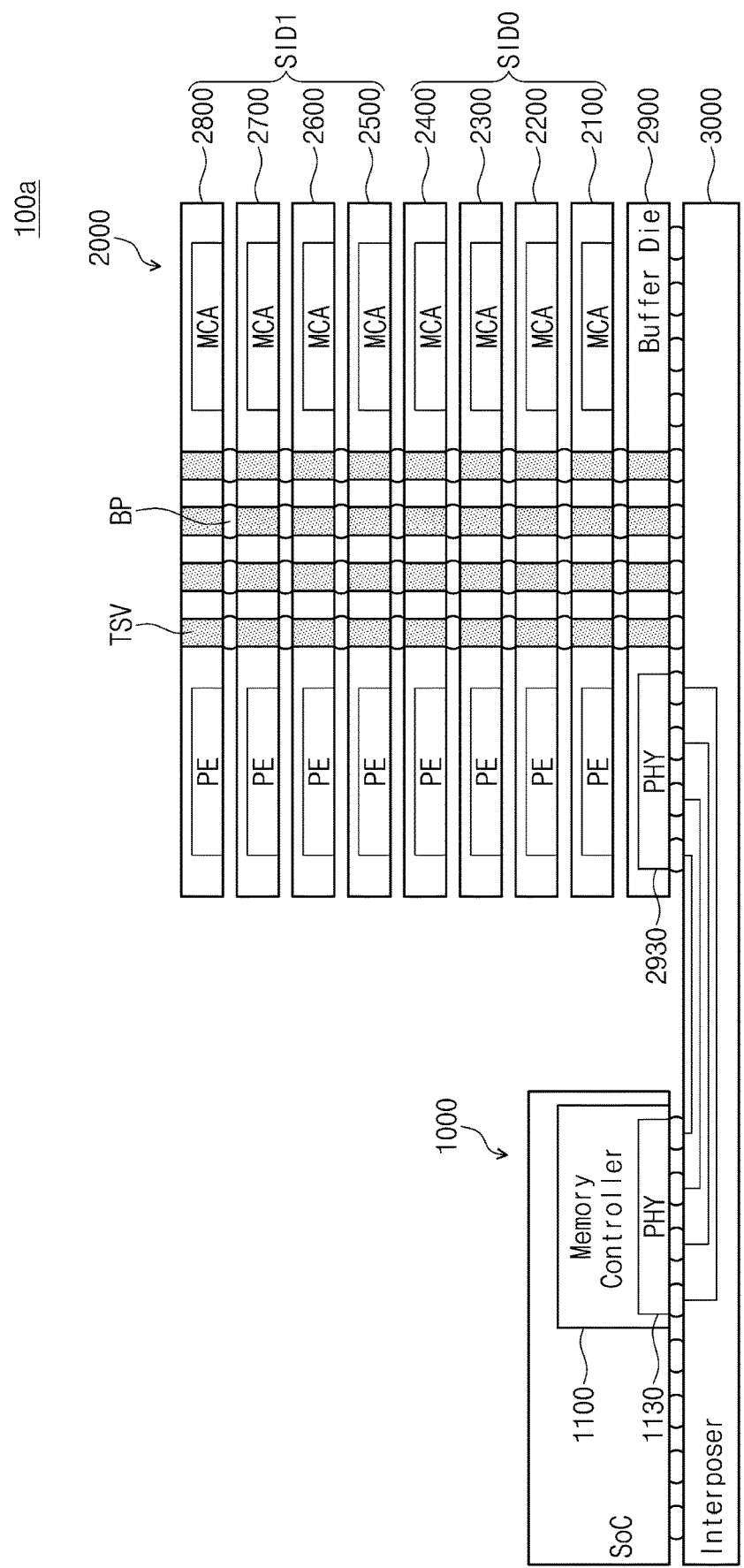
FIG. 1 illustrates an electronic device according to an example embodiment of the inventive concept.

FIG. 1 illustrates an electronic device 100a according to an example embodiment of the inventive concept. The electronic device 100a may include a system on chip (SoC) 1000, a memory device 2000, and an interposer 3000. The electronic device 100a may be also referred to as a "computing system" or an "electronic system".

The system on chip 1000 may execute applications that the electronic device 100a supports by using the memory device 2000. The system on chip 1000 may also be referred to as a "host" or an "application processor (AP)". The system on chip 1000 may include a memory controller 1100 that controls the memory device 2000 and performs an operation to input data to the memory device 2000 and/or output data from the memory device 2000. For example, the memory controller 1100 may access the memory device 2000 in a direct memory access (DMA) manner. The memory controller 1100 may include a physical layer (PHY) 1130 that is electrically connected with a PHY 2930 of the memory device 2000 through the interposer 3000.

The memory device 2000 may include processing in memory or processor in memory (PIM) dies 2100 to 2800 and a buffer die 2900. Each of the PIM dies 2100 to 2800 may be also referred to a "memory die", a "core die", a "function in memory (FIM) die", or a "controlee die", and the buffer die 2900 may be also referred to as an "interface die", a "logic die", or a "controller die". A die may be also referred to as a "chip". The PIM die 2100 may be stacked on the buffer die 2900, and the PIM die 2200 may be stacked on the PIM die 2100. The memory device 2000 may have a three-dimensional memory structure in which the plurality of dies 2100 to 2900 are stacked. To stack the dies 2100 to 2900, the memory device 2000 may include through silicon vias TSV penetrating the dies 2100 to 2900 and micro bumps BP electrically connecting the through silicon vias TSV. The through silicon vias TSV and the micro bumps BP may provide electrical and physical paths between the dies 2100 to 2900 in the memory device 2000. Here, the number of through silicon vias TSV and the number of micro bumps BP are not limited to the example illustrated in FIG. 1.

The memory device 2000 may relate to the PIM or FIM and may further perform a data processing operation in addition to reading and writing data. The memory device 2000 may correspond to a computational memory device including a random access memory (RAM) and a processing element (PE) integrated in the same die. Each of the PIM dies 2100 to 2800 of the memory device 2000 may include a memory cell array MCA that is used to read and write data and includes a plurality of memory cells and a processing element PE that executes a processing operation on data. For example, the PE may be also referred to as a "processor" or a "processing circuit".

A stack identifier SID0 may be allocated to the PIM dies 2100 to 2400, and a stack identifier SID1 may be allocated to the PIM dies 2500 to 2800. The stack identifier SID0 and SID1 may be used to identify or distinguish the plurality of PIM dies 2100 to 2800 stacked on the buffer die 2900. For example, the memory controller 1100 may access the PIM dies 2100 to 2400 using the stack identifier SID0 or the memory controller 1100 may access the PIM dies 2500 to 2800 by using the stack identifier SID1. Here, the total number of PIM dies 2100 to 2800 are not limited to the example illustrated in FIG. 1. Also, the number of PIM dies 2100 to 2400 per stack identifier SID0 and or the number of PIM dies 2500 to 2800 per stack identifier SID1 are not limited to the example illustrated in FIG. 1.

The buffer die 2900 may operate as an interface circuit between the memory controller 1100 and the PIM dies 2100 to 2800. The buffer die 2900 may receive a command, data, signals, etc. transmitted from the memory controller 1100 through the interposer 3000 and may transmit the received command, data, signals, etc. to the PIM dies 2100 to 2800 through the through silicon vias TSV and the micro bumps BP. The buffer die 2900 may receive data output from the PIM dies 2100 to 2800 through the through silicon vias TSV and the micro bumps BP and may transmit the received data to the memory controller 1100 through the interposer 3000. The buffer die 2900 may include the PHY 2930, buffering circuits, or interface circuits that receive and amplify the above signals.

In an example embodiment, the memory device 2000 may be a general-purpose dynamic random access memory (DRAM) such as DDR SDRAM (Double Data Rate Synchronous Dynamic Random Access Memory), a mobile DRAM device such as LPDDR (low power double data rate) SDRAM, a graphics DRAM device such as GDDR (Graphics Double Data Rate) SGRAM (Synchronous Graphics Random Access Memory), or a DRAM device, which provides a high capacity and a high bandwidth, such as Wide I/O, HBM (High Bandwidth Memory), HBM2, HBM3, or HMC (Hybrid Memory Cube).

The interposer 3000 may connect the system on chip 1000 and the memory device 2000. The interposer 3000 may provide physical paths that connect the PHY 2930 of the memory device 2000 and the PHY 1130 of the system on chip 1000 and are formed of conductive materials for an electrical connection. A substrate or a printed circuit board (PCB) may be used instead of the interposer 3000.

Figure 2:
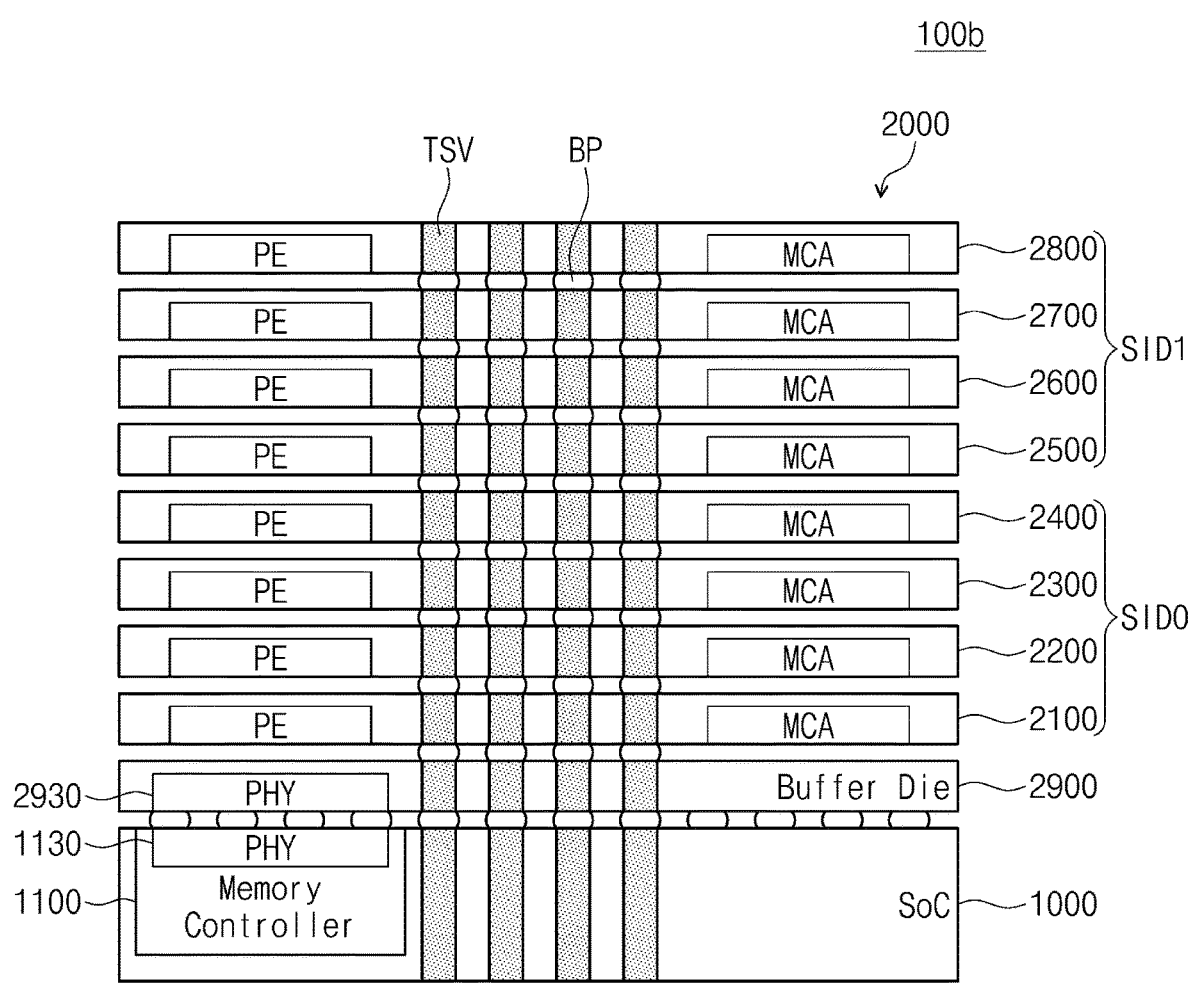
FIG. 2 illustrates an electronic device according to another example embodiment of the inventive concept.

FIG. 2 illustrates an electronic device according to another example embodiment of the inventive concept. An electronic device 100b may include the system on chip 1000 and the memory device 2000. The system on chip 1000 and the memory device 2000 in the electronic device 100a may be interconnected through the interposer 3000, while the memory device 2000 of the electronic device 100b may be stacked on the system on chip 1000. The system on chip 1000 may further include the through silicon vias TSV that are used to implement an electrical connection with the memory device 2000, PHY 1130 of the system on chip 1000, the PHYS 2930 of the memory device 2000 may be electrically interconnected through the micro bumps BP.

Figure 3:
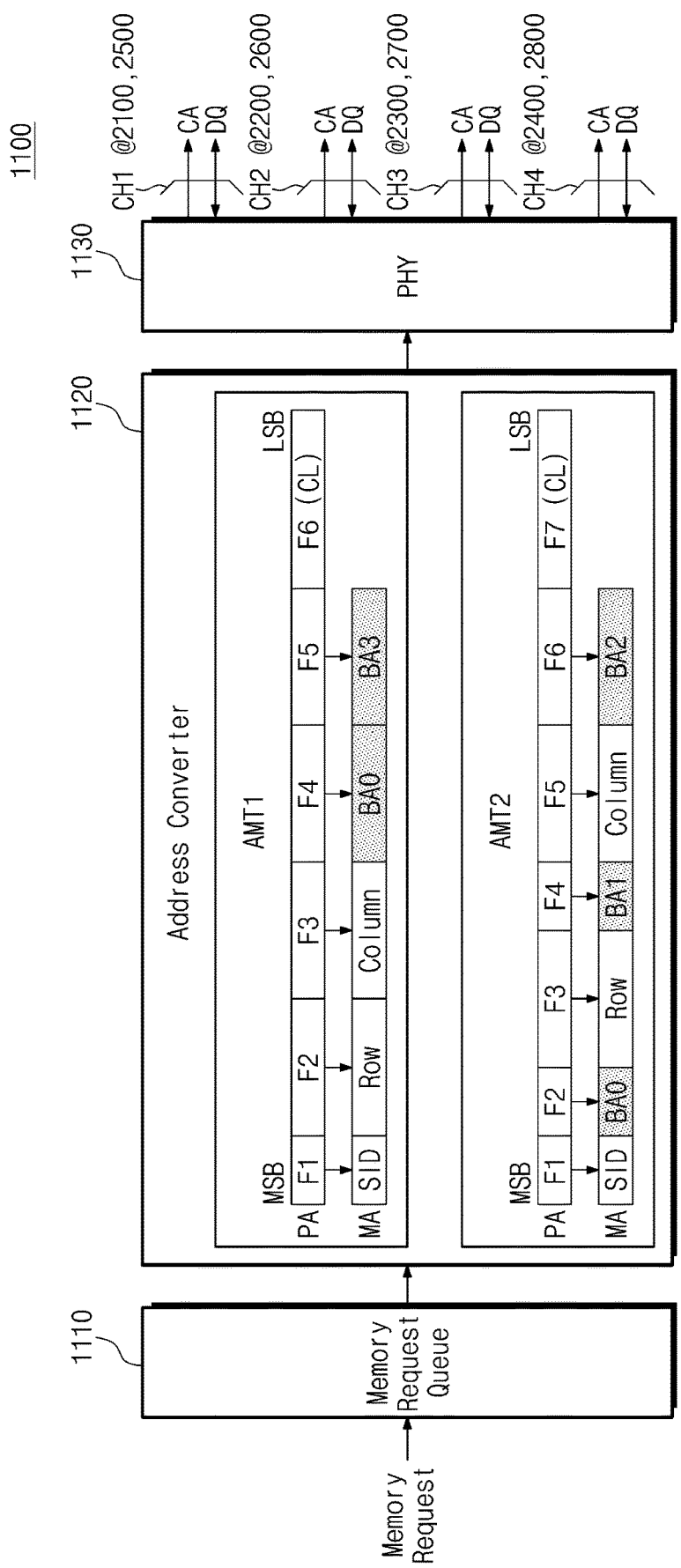
FIG. 3 illustrates a block diagram of a memory controller of a system on chip of FIGS. 1 and 2.

FIG. 3 illustrates a block diagram of a memory controller of a system on chip of FIGS. 1 and 2. The memory controller 1100 may include a memory request queue 1110, an address converter 1120, and the PHY 1130. For example, the above components, a memory request queue 1110, an address converter 1120, and the PHY 1130, and other components of the memory controller 1100 may be implemented by hardware.

The memory request queue 1110 may receive and store a memory request that is generated within the system on chip 1000. A memory request associated with the memory device 2000 may request an operation (e.g., a read operation, a write operation, a refresh operation, or a processing operation) of the memory device 2000 and may include a physical address of the memory device 2000. The physical address may be used to access the memory device 2000 and may be limited according to a capacity of the memory device 2000. According to an example embodiment, unlike a virtual address, the physical address may be limited according to a capacity of the memory device 2000. A speed at which a memory request is generated at the system on chip 1000 may be higher than a speed at which a memory request is processed by the memory device 2000. The memory request queue 1110 may store a plurality of memory requests.

The address converter 1120 may convert a physical address PA of a memory request stored in the memory request queue 1110 into a memory address MA. The memory address MA may be used to access the memory device 2000 and may indicate a specific area of the memory device 2000. According to an example embodiment, the specific area may be a specific die, or a register or memory cells in a specific die. The address converter 1120 may convert the physical address PA into the memory address MA based on a plurality of address mapping tables. For example, the plurality of address mapping tables may include a first address mapping table AMT1 and a first address mapping table AMT2.

For example, the address converter 1120 may select one of the plurality of address mapping tables AMT1 and AMT2 based on a logical value (e.g., 0 or 1) of a bit of the physical address PA, which corresponds to the stack identifier SID of the memory address MA, and may convert the physical address PA into the memory address MA based on the selected address mapping table. According to the example embodiment illustrated in FIG. 3, the number of address mapping tables is two, i.e., AMT1 and AMT2. As such, the description is given as the number of bits used to select the plurality of address mapping tables AMT1 and AMT2 is one. However, the number of address mapping tables is not limited to 2, instead the number of address mapping tables is more than 2e. In this case, the number of bits used to select the plurality of address mapping tables AMT1 and AMT2 may be more than one. For another example, a most significant bit MSB of the physical address PA may be used to select the plurality of address mapping tables AMT1 and AMT2.

According to an example embodiment, the address converter 1120 may check a first logical value of the bit of the physical address PA, which corresponds to the stack identifier SID of the memory address MA, and may select the address mapping table AMT1. The address converter 1120 may divide or classify bits of the physical address PA into fields F1 to F6 based on the address mapping table AMT1. A bit of the field F1 may correspond to a bit (or an upper bit) above bits of the field F6. For example, the bit of the field F1 may be the MSB of the physical address PA. The address mapping table AMT1 may map the bit of the field F1 onto the stack identifier SID, bits of the field F2 onto a row address Row, bits of the field F3 onto a column address Column, bits of the fields F4 and F5 onto a bank address BA0 to BA3, and the bits of the field F6 being bits (or lower bits) below the fields F1 to F5 onto a cache line CL. The address converter 1120 may map the bit of the field F1 onto the stack identifier SID, the bits of the field F2 onto the row address Row, the bits of the field F3 onto the column address Column, and the bits of the fields F4 and F5 onto the bank address BA0 to BA3 based on the address mapping table AMT1. The memory address MA may include the stack identifier SID, the bank address BA0 to BA3, the row address Row, and the column address Column. The stack identifier SID may be used to identify the PIM dies 2100 to 2800 described with reference to FIGS. 1 to 2. The bank address BA0 to BA3 may be used to identify banks constituting the memory cell array MCA of each of the PIM dies 2100 to 2800. The row address Row and the column address Column may be used to identify memory cells in a bank. The cache line CL may correspond to a unit of a cache in the system on chip 1000 and may include data associated with the memory device 2000 (e.g., read data read from the memory device 2000 or write data to be written in the memory device 2000). The bits of the fields F1 to F5 may constitute the memory address MA. The address mapping table AMT1 may map upper bits of the physical address PA onto the stack identifier SID, the row address Row, and the column address Column of the memory address MA and may map lower bits of the physical address PA onto the bank address BA0 to BA3 of the memory address MA. When the address mapping table AMT1 is selected, the bits of the physical address PA converted into the bank address BA0 to BA3 of the memory address MA may correspond to bits (or lower bits) below the bits of the physical address PA converted into the row address Row and the column address Column of the memory address MA. The number of bits included in each of the fields F1 to F6 may be one or more.

According to an example embodiment, the address converter 1120 may check the second logical value of the bit of the physical address PA, which corresponds to the stack identifier SID of the memory address MA, and selects the address mapping table AMT2. The address converter 1120 may divided or classify bits of the physical address PA into fields F1 to F7 based on the address mapping table AMT2. The address mapping table AMT2 may map the bit of the field F1 onto the stack identifier SID, bits of the field F3 onto the row address Row, bits of the field F5 onto the column address Column, bits of the fields F2, F4, and F6 onto the bank address BA0 to BA3, and bits of the field F7 being bits (or lower bits) below the fields F1 to F6 onto the cache line CL. The address converter 1120 may map the bit of the field F1 onto the stack identifier SID, the bits of the field F3 onto the row address Row, the bits of the field F5 onto the column address Column, and the bits of the fields F2, F4, and F6 onto the bank address BA0 to BA3 based on the address mapping table AMT2. The bits of the fields F1 to F6 may constitute the memory address MA. When not the address mapping table AMT1 but the address mapping table AMT2 is selected, at least one (being BA1 in FIG. 3 but being not limited thereto) of the bits of the physical address PA converted into the bank address BA0 to BA3 of the memory address MA may correspond to a bit (or an upper bit) above the bits of the physical address PA converted into the column address Column of the memory address MA. Also, at least one (being BA0 in FIG. 3 but being not limited thereto) of the bits of the physical address PA converted into the bank address BA0 to BA3 of the memory address MA may correspond to a bit (or an upper bit) above the bits of the physical address PA converted into the row address Row of the memory address MA. For example, the bits of the physical address PA converted into the row address Row or the column address Column of the memory address MA may be placed between the bits of the physical address PA converted into the bank address BA0 to BA3 of the memory address MA. A location on the physical address PA, at which the bit of the field F1 converted into the stack identifier SID by the address mapping table AMT1 is placed, may be identical to a location on the physical address PA, at which the bit of the field F1 converted into the stack identifier SID by the address mapping table AMT2 is placed. A location on the physical address PA, at which the bits of the field F6 corresponding to the cache line CL are placed according to the address mapping table AMT1, may be identical to a location on the physical address PA, at which the bits of the field F7 corresponding to the cache line CL are placed according to the address mapping table AMT2.

According to the example embodiment described above, the address converter 1120 checks first logical value of the bit of the physical address PA and selects the address mapping table AMT1, and the address converter 1120 checks the second logical value of the bit of the physical address PA, and selects the address mapping table AMT2. However, the disclosure is not limited thereto. For instance, according to another example embodiment, the address converter 1120 may check the second logical value of the bit of the physical address PA and select the address mapping table AMT1, and the address converter 1120 may check a first logical value of the bit of the physical address PA, and select the address mapping table AMT2.

The mapping of the address mapping table AMT1 and the mapping of the address mapping table AMT2 may be different from each other and may be independent of each other. For example, locations of the bits of the physical address PA converted into the bank address BA0 to BA3 of the memory address MA by the address mapping table AMT1 may be different from locations of the bits of the physical address PA converted into the bank address BA0 to BA3 of the memory address MA by the address mapping table AMT2. For example, locations on the physical address PA, at which bits corresponding to the bank address BA0 to BA3 are placed, may be changed according to the address mapping tables AMT1 and AMT2.

The address converter 1120 may simultaneously support the address mapping tables AMT1 and AMT2 that are different. A way to arrange data in the memory device 2000 when the address mapping table AMT1 is selected may be different from a way to arrange data in the memory device 2000 when the address mapping table AMT2 is selected. For example, the memory controller 1100 may select the address mapping table AMT1 with regard to a PIM die (e.g., the PIM dies 2100 to 2400 having SID0 of FIGS. 1 and 2), which is intended to perform a read operation or a write operation without the execution of the PE, from among the plurality of PIM dies 2100 to 2800. In contrast, the memory controller 1100 may select the address mapping table AMT2 with regard to a PIM die (e.g., the PIM dies 2500 to 2800 having SID1 of FIGS. 1 and 2), which is intended to execute the PE, from among the plurality of PIM dies 2100 to 2800. According to the exemplary manner of selecting an address mapping table, the arrangement of data in the PIM die performing only the read operation or the write operation may be different from the arrangement of data in the PIM die executing the PE. Accordingly, as the memory controller 1100 according to an embodiment of the inventive concept dynamically selects one of the address mapping tables AMT1 and AMT2 depending on whether to execute the PE in the PIM die, the memory controller 1100 may arrange data to be appropriate for the read operation or the write operation in the PIM die not executing the PE and may arrange data to be appropriate for the execution of the PE in the PIM die executing the PE.

The PHY 1130 may access the memory device 2000 based on the memory address MA of the address converter 1120. The PHY 1130 may be also referred to as a "memory interface circuit". For example, the PHY 1130 may generate and output command and address signals CA based on a memory request of the memory request queue 1110 and the memory address MA of the address converter 1120. The PHY 1130 may transmit a memory command and the memory address MA, which are based on the memory request, to the memory device 2000. The PHY 1130 may variously change logical values of the command and address signals CA depending on the memory request of the memory request queue 1110 and the memory address MA of the address converter 1120. The PHY 1130 may generate and output data input/output signals DQ based on the memory request of the memory request queue 1110 or may receive the data input/output signals DQ transmitted from the memory device 2000. The data input/output signals DQ may include write data to be written in the memory device 2000 or read data read from the memory device 2000.

The command and address signals CA and the data input/output signals DQ may be provided for each of channels CH1 to CH4. For example, the memory controller 1100 may access the PIM dies 2100 and 2500 through the channel CH1, may access the PIM dies 2200 and 2600 through the channel CH2, may access the PIM dies 2300 and 2700 through the channel CH3, and may access the PIM dies 2400 and 2800 through the channel CH4. The PIM dies 2100 and 2500 may share the channel CH1, the PIM dies 2200 and 2600 may share the channel CH2, the PIM dies 2300 and 2700 may share the channel CH3, and the PIM dies 2400 and 2800 may share the channel CH4.

The memory controller 1100 may select one of a plurality of PIM dies allocated to one channel, by using the stack identifier SID of the memory controller 1100. The memory controller 1100 may access one of a plurality of PIM dies allocated to one channel based on the memory address MA. For example, when the stack identifier SID has a first logical value (i.e., SID0), the command and address signals CA and the data input/output signals DQ transmitted through the channels CH1 to CH4 may be associated with the PIM dies 2100 to 2400. For example, when the stack identifier SID has a second logical value (i.e., SID1), the command and address signals CA and the data input/output signals DQ transmitted through the channels CH1 to CH4 may be associated with the PIM dies 2500 to 2800. For example, the number of PIM dies allocated per channel, the number of channels, the number of channels allocated to one PIM die, etc. are not limited to the example of FIG. 3. For example, a part (e.g., bits (or upper bits) above the field F1) of bits of the physical address PA may indicate whether the memory address MA is associated with any channel of the channels CH1 to CH4 and may be used to distinguish the channels CH1 to CH4.

Figure 4:
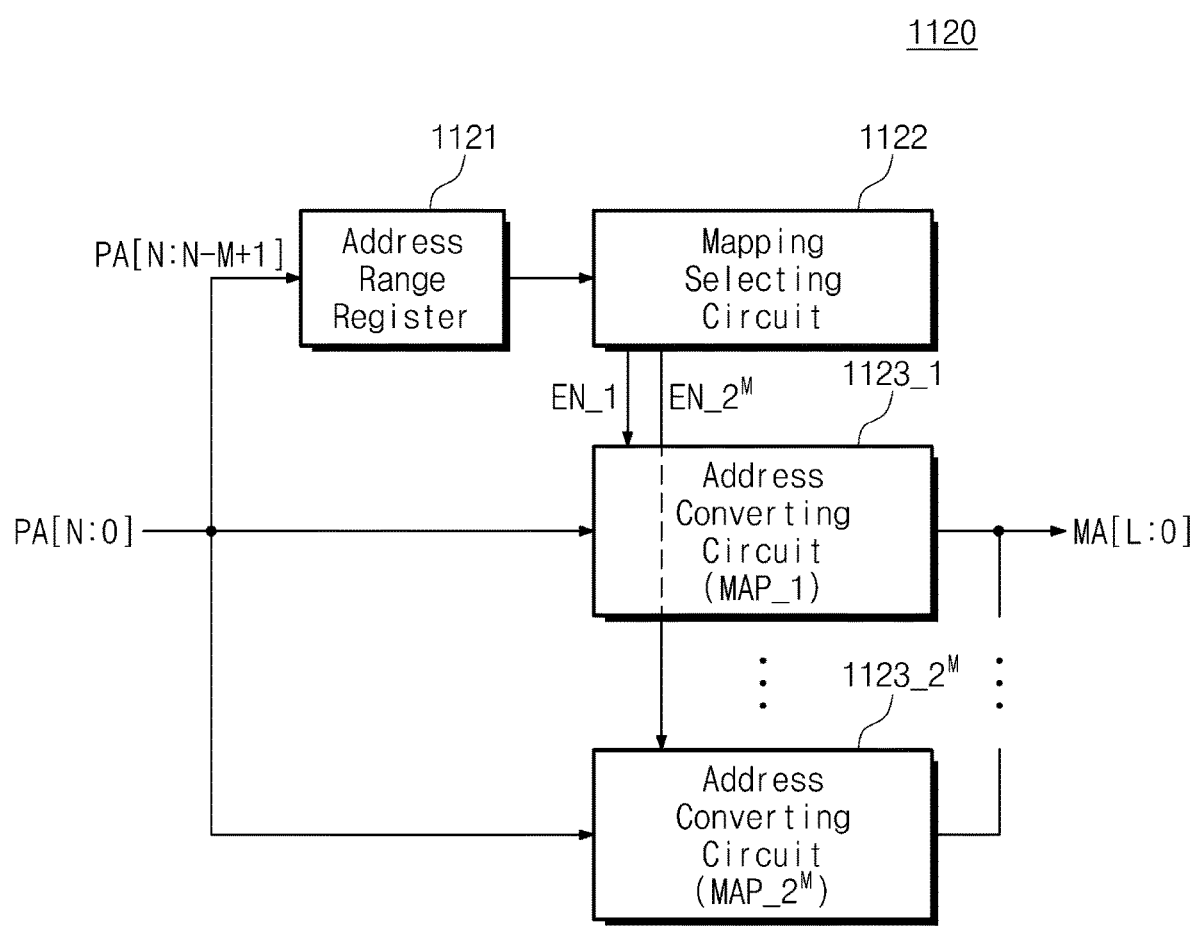
FIG. 4 illustrates a block diagram of an address converter of FIG. 3.

FIG. 4 illustrates a block diagram of an address converter of FIG. 3. The address converter 1120 may include an address range register 1121, a mapping selecting circuit 1122, and address converting circuits 1123_1 to 1123_$2^M$. For example, the address range register 1121, the mapping selecting circuit 1122, and the address converting circuits 1123_1 to 1123_$2^M$, and other components of the address converter may be implemented in a hardware manner.

The address range register 1121 may store a bit PA[N:N−M+1] of a physical address PA[N:0] (N being a natural number, "N+1" corresponding to the number of bits, and M being a natural number). Similar the case of FIG. 3, in the case where the address converter 1120 includes two address mapping tables AMT1 and AMT2, "M" may be "1", and the address range register 1121 may store a bit PA[N]. The address converter 1120 may include two or more address mapping tables, and the address range register 1121 may store one or more bits. As described above, the bit PA[N:N−M+1] stored in the address range register 1121 may be the stack identifier SID of the memory address MA.

The mapping selecting circuit 1122 may select one of the address converting circuits 1123_1 to 1123_$2^M$ depending on a value of the bit PA[N:N−M+1] stored in the address range register 1121. For example, the mapping selecting circuit 1122 may activate one of enable signals EN_1 to EN_$2^M$ for enabling the address converting circuits 1123_1 to 1123_$2^M$ depending on a value of the bit PA[N:N−M+1] stored in the address range register 1121 and may deactivate the remaining enable signals.

The address converting circuit 1123 may be activated by the enable signal EN_1 and may convert the physical address PA[N:0] into a memory address MA[L:0] (L being a natural number and smaller than N) based on the address mapping table AMT1 (being identical to the address mapping table AMT1 of FIG. 3). The address converting circuit 1124 may be activated by the enable signal EN_$2^M$ and may convert the physical address PA[N:0] into the memory address MA[L:0] based on the address mapping table AMT2 (being identical to the address mapping table AMT2 of FIG. 3). The address converter 1120 may include $2^M$ address mapping tables performing different mapping and may include $2^M$ address converting circuits 1123_1 to 1123_$2^M$ converting the physical address PA[N:0] into the memory address MA[L:0] based on the $2^M$ address mapping tables, respectively.

Figure 5:
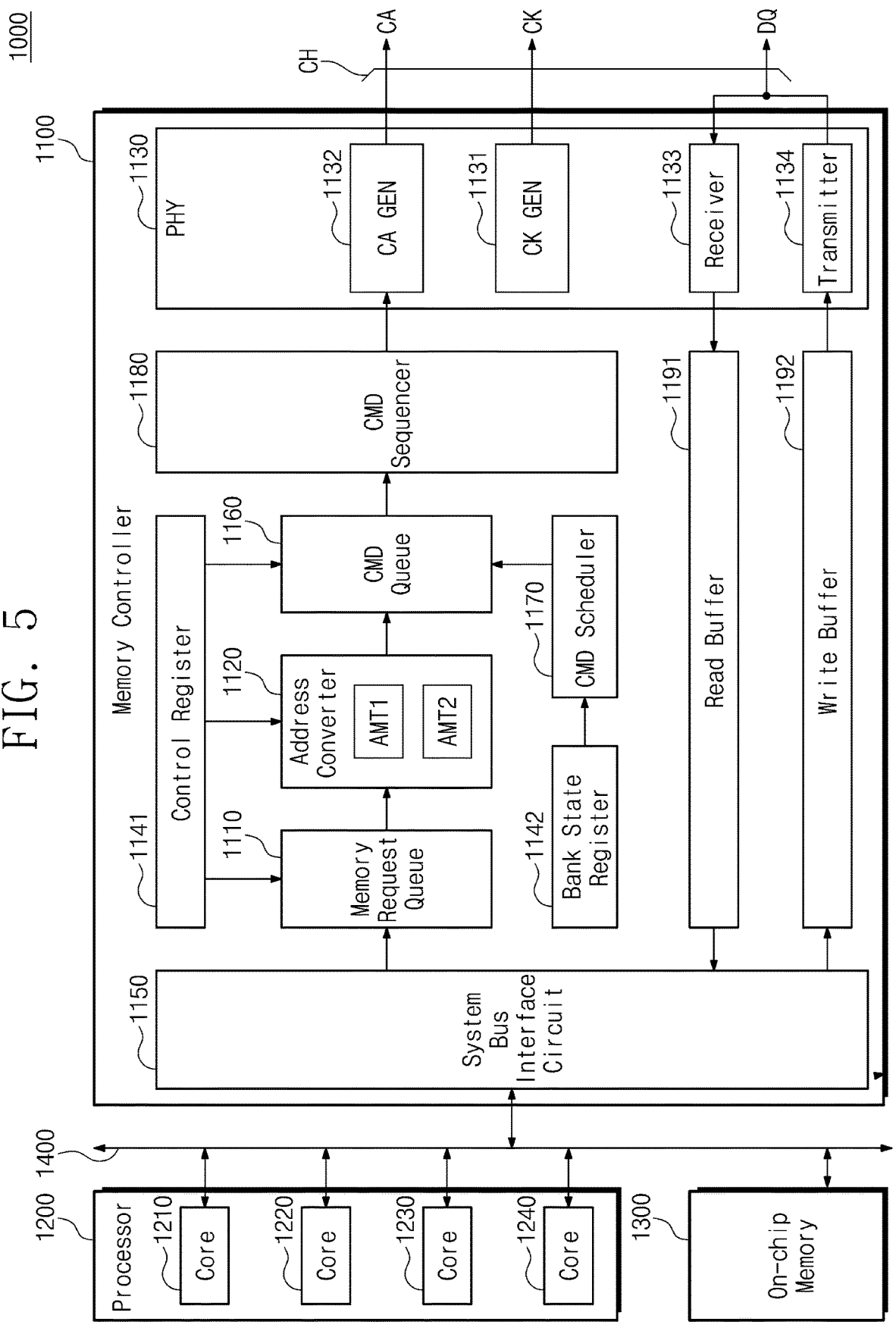
FIG. 5 illustrates a block diagram of a system on chip of FIGS. 1 and 2.

FIG. 5 illustrates a block diagram of a system on chip of FIGS. 1 and 2. The system on chip 1000 may include the memory controller 1100, a processor 1200, an on-chip memory 1300, and a system bus 1400.

The memory controller 1100 may include the memory request queue 1110, the address converter 1120, the PHY 1130, a control register 1141, a bank state register 1142, a system bus interface circuit 1150, a memory command queue 1160, a command scheduler 1170, a command sequencer 1180, a read buffer 1191, and a write buffer 1192. Detailed description of the memory request queue 1110, the address converter 1120 supporting all the different address mapping tables AMT1 and AMT2, and the PHY 1130 are provided with respect to FIGS. 3 and 4, and thus additional description associated with the memory request queue 1110, the address converter 1120, and the PHY 1130 will be omitted to avoid redundancy.

The control register 1141 may store and provide pieces of control information of the memory request queue 1110, the address converter 1120, the PHY 1130, the control register 1141, the bank state register 1142, the system bus interface circuit 1150, the memory command queue 1160, the command scheduler 1170, the command sequencer 1180, the read buffer 1191, and the write buffer 1192 in the memory controller 1100. The control information stored in the control register 1141 may be changed by the processor 1200 or by a request of a user. The memory request queue 1110, the address converter 1120, the PHY 1130, the control register 1141, the bank state register 1142, the system bus interface circuit 1150, the memory command queue 1160, the command scheduler 1170, the command sequencer 1180, the read buffer 1191, and the write buffer 1192 may operate based on the pieces of control information stored in the control register 1141, respectively.

The bank state register 1142 may store state information of a plurality of banks (refer to FIGS. 7 and 8 for detailed description) in the memory device 2000. For example, the state information may indicate whether a bank is activated or whether a bank is precharged.

The system bus interface circuit 1150 may receive memory requests transmitted from a plurality of cores 1210, 1220, 1230, and 1240 in the processor 1200 through the system bus 1400 based on a communication protocol of the system bus 1400. The system bus interface circuit 1150 may provide, transmit, or write the received memory request to the memory request queue 1110. According to another example embodiment, the plurality of cores in the processor 1200 are not limited to the plurality of cores 1210, 1220, 1230, and 1240 illustrated in FIG. 5.

The memory command queue 1160 may store memory commands for memory requests stored in the memory request queue 1110 and memory addresses converted by the address converter 1120. The command scheduler 1170 may adjust the order of processing memory commands and memory addresses stored in the memory command queue 1160 based on state information of banks stored in the bank state register 1142. The command scheduler 1170 may perform scheduling on memory commands and memory addresses stored in the memory command queue 1160. The command sequencer 1180 may output or provide memory commands and memory addresses stored in the memory command queue 1160 to the PHY 1130 based on the order scheduled by the command scheduler 1170.

The PHY 1130 may include a clock (CK) generator 1131, a command and address (CA) generator 1132, a receiver 1133, and a transmitter 1134. The clock generator 1131 may generate a clock signal CK that is output to the memory device 2000. For example, the memory device 2000 may be a synchronous memory device that operates based on the clock signal CK. The command and address generator 1132 may receive a memory command and a memory address from the command sequencer 1180 and may transmit the command and address signals CA including the memory command and the memory address to the memory device 2000. The receiver 1133 may receive the data input/output signals DQ including read data transmitted from the memory device 2000. The receiver 1133 may provide the received read data to the read buffer 1191. The transmitter 1134 may receive write data from the write buffer 1192. The transmitter 1134 may transmit the data input/output signals DQ including the write data to the memory device 2000. A channel CH of FIG. 5 may correspond to one of the channels CH1 to CH4 of FIG. 3. The PHY 1130 may generate and output the clock signal CK and the command and address signals CA of each of the channels CH1 to CH4 and may exchange the data input/output signals DQ of each of the channels CH1 to CH4 with the memory device 2000.

The read buffer 1191 may store read data provided from the receiver 1133. For example, the read buffer 1191 may provide the system bus interface circuit 1150 with read data as much as a cache line CL, and the system bus interface circuit 1150 may transmit the read data to the processor 1200 or the on-chip memory 1300 through the system bus 1400. The write buffer 1192 may receive and store write data that are provided from the system bus interface circuit 1150 so as to be transmitted to the memory device 2000. The write buffer 1192 may provide the transmitter 1134 with write data as much as a data input/output unit of the memory device 2000.

The processor 1200 may execute various software (e.g., an application program, an operating system, a file system, and a device driver) loaded onto the on-chip memory 1300. The processor 1200 may include a plurality of homogeneous cores or a plurality of heterogeneous cores and may include the plurality of cores 1210 to 1240. For example, each of the cores 1210 to 1240 may include at least one of a central processing unit (CPU), an image signal processing unit (ISP), a digital signal processing unit (DSP), a graphics processing unit (GPU), a vision processing unit (VPU), a tensor processing unit (TPU), and a neural processing unit (NPU). Each of the cores 1210 to 1240 may generate a memory request associated with the memory device 2000. The memory request generated by each of the cores 1210 to 1240 may include the physical address PA described above. An application program, an operating system, a file system, a device driver, etc. for driving the electronic device 100a/100b may be loaded onto the on-chip memory 1300. For example, the on-chip memory 1300 may be a static RAM (SRAM) having a data input/output speed higher than the memory device 2000 or may be a cache memory shared by the cores 1210 to 1240, but the inventive concept is not limited thereto. The system bus 1400 may provide a communication path between the memory controller 1100, the processor 1200, and the on-chip memory 1300. For example, the system bus 1400 may be AHB (Advanced High-performance Bus), ASB (Advanced System Bus), APB (Advanced Peripheral Bus), or AXI (Advanced eXtensible Interface) that is based on the AMBA (Advanced Microcontroller Bus Architecture).

Figure 6:
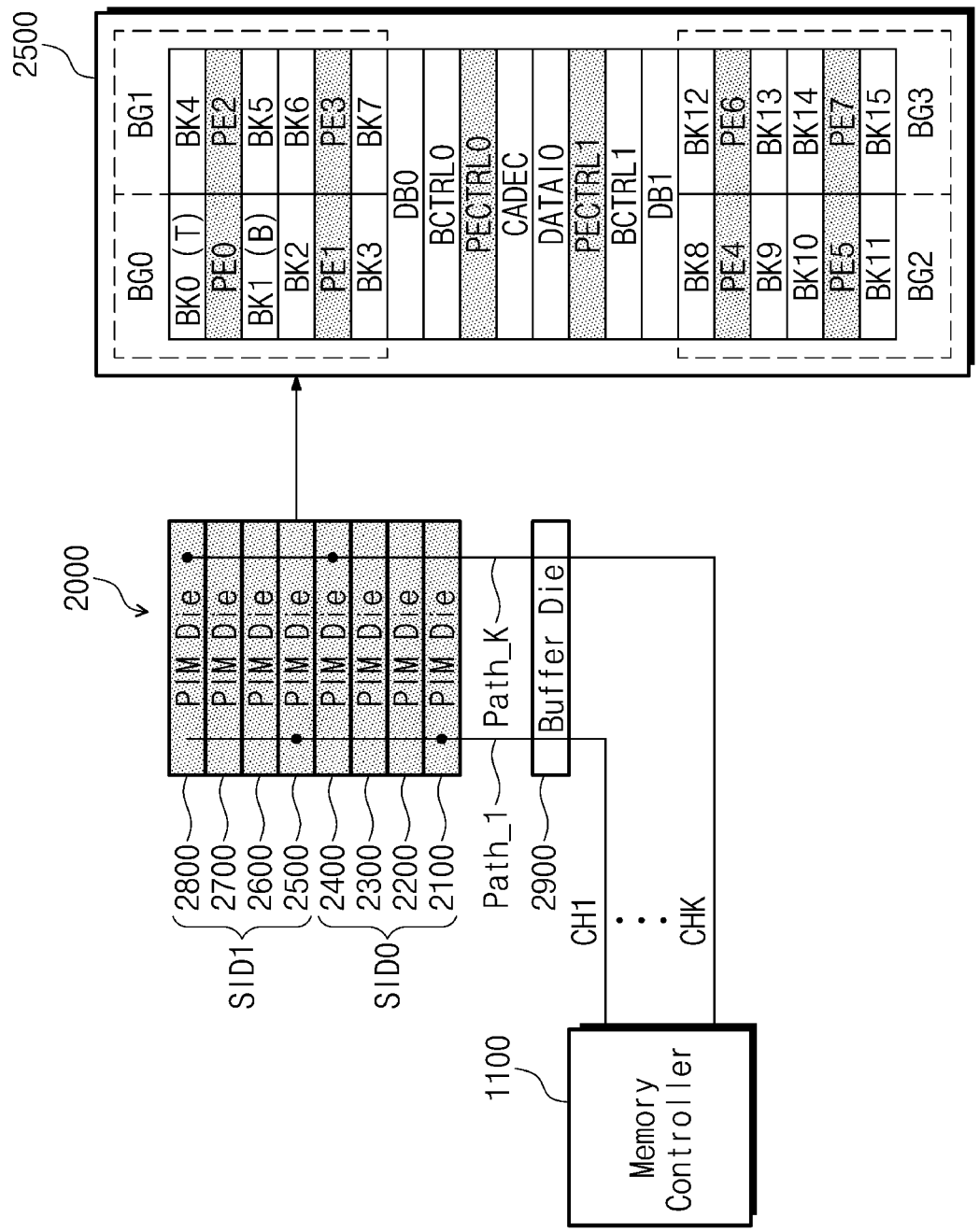
FIG. 6 illustrates a memory device of FIGS. 1 and 2 in detail.

FIG. 6 illustrates a memory device of FIGS. 1 and 2 in detail. The memory controller 1100 may access the memory device 2000 through channels CH1 to CHK (K being a natural number of 2 or more). For example, the PIM dies 2100 and 2500 may be allocated to the channel CH1, and the PIM dies 2400 and 2800 may be allocated to the channel CHk. As in the above description, the remaining dies 2200, 2300, 2600 and 2700 may be allocated to other channels. The PIM dies 2100 and 2500 allocated to the same channel CH may be identified by the stack identifier SID0/1. The memory device 2000 may include paths Path_1 to Path_K that respectively correspond to the channels CH1 to CHK and through which signals transmitted through the channels CH1 to CHK are transmitted. The paths Path_1 to Path_K may provide electrical connection paths between the buffer die 2900 and the PIM dies 2100 to 2800 and may include the through silicon vias TSV and the micro bumps BP described with reference to FIGS. 1 and 2.

The PIM die 2500 may include bank groups BG0 to BG3, data buses DB0 and DB1, bank controllers BCTRL0 and BCTRL1, PE controllers PECTRL0 and PECTRL1, a command and address decoder CADEC, and a data input/output circuit DATAIO. Although, only the PIM die 2500 may be in detail described and illustrated, configurations and operations of the remaining PIM dies 2100 to 2400 and 2600 to 2800 may be similar or substantially identical to those of the PIM die 2500.

The bank groups BG0 to BG3 may be identified by bank address bits BA2 and BA3 of a bank address BA0 to BA3 (or referred to as "bank address bits BA0 to BA3"). For example, when BA2=0 and BA3=0, the bank group BG0 may be selected. The bank group BG0 may include banks BK0 to BK3. Banks in one bank group may be identified by bank address bits BA0 and BA1 of the bank address BA0 to BA3. For example, when BA0=0, BA1=0, BA2=0, and BA3=0, the bank BK0 may be selected. The memory cell array MCA of FIGS. 1 and 2 may be divided into banks BK0 to BK15. Each of banks BK0, BK2, BK4, BK6, BK8, BK10, BK12, and BK14 capable of being selected when the bank address bit BA0 corresponding to an LSB from among the bank address bits BA0 to BA3 is "0" may be referred to as a top (or even-numbered) bank. Each of banks BK1, BK3, BK5, BK7, BK9, BK11, BK13, and BK15 capable of being selected when the bank address bit BA0 corresponding to an LSB from among the bank address bits BA0 to BA3 is "1" may be referred to as a bottom (or odd-numbered) bank. For example, each of the banks BK0 to BK15 may include an equal number of memory cells, and each of the bank groups BG0 to BG3 may include an equal number of banks. For example, the bank groups BG0 to BG3 may be implemented to be identical, and the banks BK0 and BK15 may be implemented to be identical.

The bank group BG0 may include a PE0 and a PE1. For example, the PE0 may execute a calculation on data of the banks BK0 and BK1, and the PE1 may execute a calculation on data of the banks BK2 and BK3. The bank group BG1 may include a PE2 executing a calculation on data of the banks BK4 and BK5 and a PE3 executing a calculation on data of the banks BK6 and BK7. As in the bank groups BG0 and BG1, the bank groups BG2 and BG3 may include PE4 to PE7. For example, the PE0 to the PE7 may correspond to the PE of each of the PIM dies 2100 to 2800 of FIGS. 1 and 2 or may constitute the PE of each of the PIM dies 2100 to 2800 of FIGS. 1 and 2.

The number of bank groups included in one PIM die 2500 and the number of banks per bank group are not limited to the example of FIG. 6. An example is illustrated as one channel CH1 is allocated to the PIM die 2500 and the bank groups BG0 to BG3 and the banks BK0 to BK15 are allocated to the channel CH1, but the inventive concept is not limited thereto. A different channel or channels may be further allocated to the PIM die 2500, and the PIM die 2500 may further include bank groups and banks allocated to the different channel(s). For example, the PIM die 2500 may include the bank groups BG0 to BG15 and the banks BK0 to BK63 allocated to four channels CH1 to CH4; as in the channel CH1 exemplified in FIG. 6, bank groups and banks for each channel may be implemented in the PIM die 2500. The description is given as one bank group includes two PEs and one PE is allocated to two banks; however, one bank group may include PEs same as the number of banks, or one PE may be allocated to one bank. In any case, the inventive concept is not limited to the above numerical values.

The data bus DB0 may include data input/output paths associated with the bank groups BG0 and BG1. For example, data to be written in the banks BK0 to BK3 or the banks BK4 to BK7, data read from the banks BK0 to BK3 or the banks BK4 to BK7, data to be processed by the PE0 and the PE1 or the PE2 and the PE3, data processed by the PE0 and the PE1 or the PE2 and the PE3, etc. may be transmitted through the data bus DB0. The data bus DB1 may include data input/output paths associated with the bank groups BG2 and BG3. Except for allocated bank groups, the data buses DB0 and DB1 may be implemented to be identical or may be integrated.

The bank controller BCTRL0 may control the banks BK0 to BK7 of the bank groups BG0 and BG1 under control of the command and address decoder CADEC. The bank controller BCTRL1 may control the banks BK8 to BK15 of the bank groups BG2 and BG3 under control of the command and address decoder CADEC. For example, the bank controllers BCTRL0 and BCTRL1 may activate or precharge the banks BK0 to BK15. Except for allocated bank groups, the bank controllers BCTRL0 and BCTRL1 may be implemented to be identical or may be integrated.

The PE controller PECTRL0 may control the PE0 to the PE3 of the bank groups BG0 and BG1 under control of the command and address decoder CADEC. The PE controller PECTRL1 may control the PE4 to the PE7 of the bank groups BG2 and BG3 under control of the command and address decoder CADEC. For example, the PE controllers PECTRL0 and PECTRL1 may select data to be processed by the PE0 to the PE7 or data processed by the PE0 to the PE7 or may control timings at which the PE0 to the PE7 initiate or terminate calculations. Except for allocated PEs, the PE controllers PECTRL0 and PECTRL1 may be implemented to be identical or may be integrated.

The command and address decoder CADEC may receive command and address signals CA (refer to FIG. 5) transmitted through the channel CH1 and the path Path_1, based on a clock signal CK (refer to FIG. 5) transmitted through the channel CH1 and the path Path_1. The command and address decoder CADEC may decode the command and address signals CA. The command and address decoder CADEC may control components of the PIM die 2500 based on a decoding result.

Under control of the command and address decoder CADEC, the data input/output circuit DATAIO may receive the data input/output signals DQ (refer to FIG. 5) transmitted through the channel CH1 and the path Path_1 and may provide write data included in the data input/output signals DQ to the banks BK0 to BK15 of the bank groups BG0 to BG3. The data input/output circuit DATAIO may receive read data output from the banks BK0 to BK15 and the PEs PE0 to PE7 of the bank groups BG0 to BG3 and may output the data input/output signals DQ including the read data. The data input/output signals DQ including the read data may be transmitted to the memory controller 1100 through the path Path_1 and the channel CH1.

Figure 7:
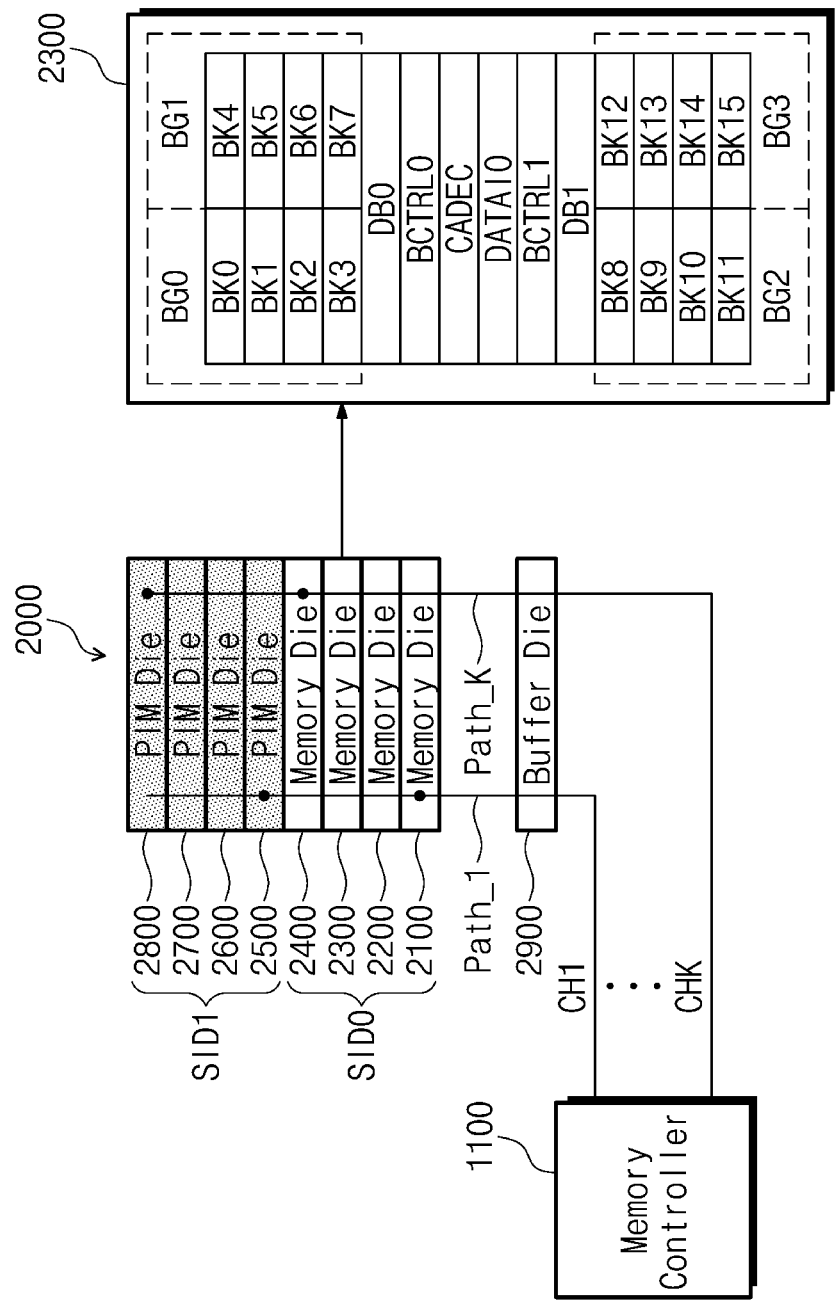
FIG. 7 illustrates a memory device of FIGS. 1 and 2 in detail.

FIG. 7 illustrates a memory device of FIGS. 1 and 2 in detail. A description will be focused on a difference between the memory device 2000 of FIG. 6 and the memory device 2000 of FIG. 7. The memory device 2000 may include the memory dies 2100 to 2400 and the PIM dies 2500 to 2800. Each of the PIM dies 2500 to 2800 may be substantially identical to the PIM die 2500 of FIG. 6. Each of the memory dies 2100 to 2400 may be different from the PIM die 2500 of FIG. 6. The memory die 2300 may include the bank groups BG0 to BG3, the banks BK0 to BK15, the data buses DB0 and DB1, the bank controllers BCTRL0 and BCTRL1, the command and address decoder CADEC, and the data input/output circuit DATAIO, which are described with reference to FIG. 6. The memory die 2300 may not include the PE0 to the PE7 and the PE controllers PECTRL0 and PECTRL1 and may not be referred to as a "PIM die". A configurations and an operation of each of the remaining memory dies 2100, 2200, and 2400 may be substantially identical to the memory die 2300.

Figure 8:
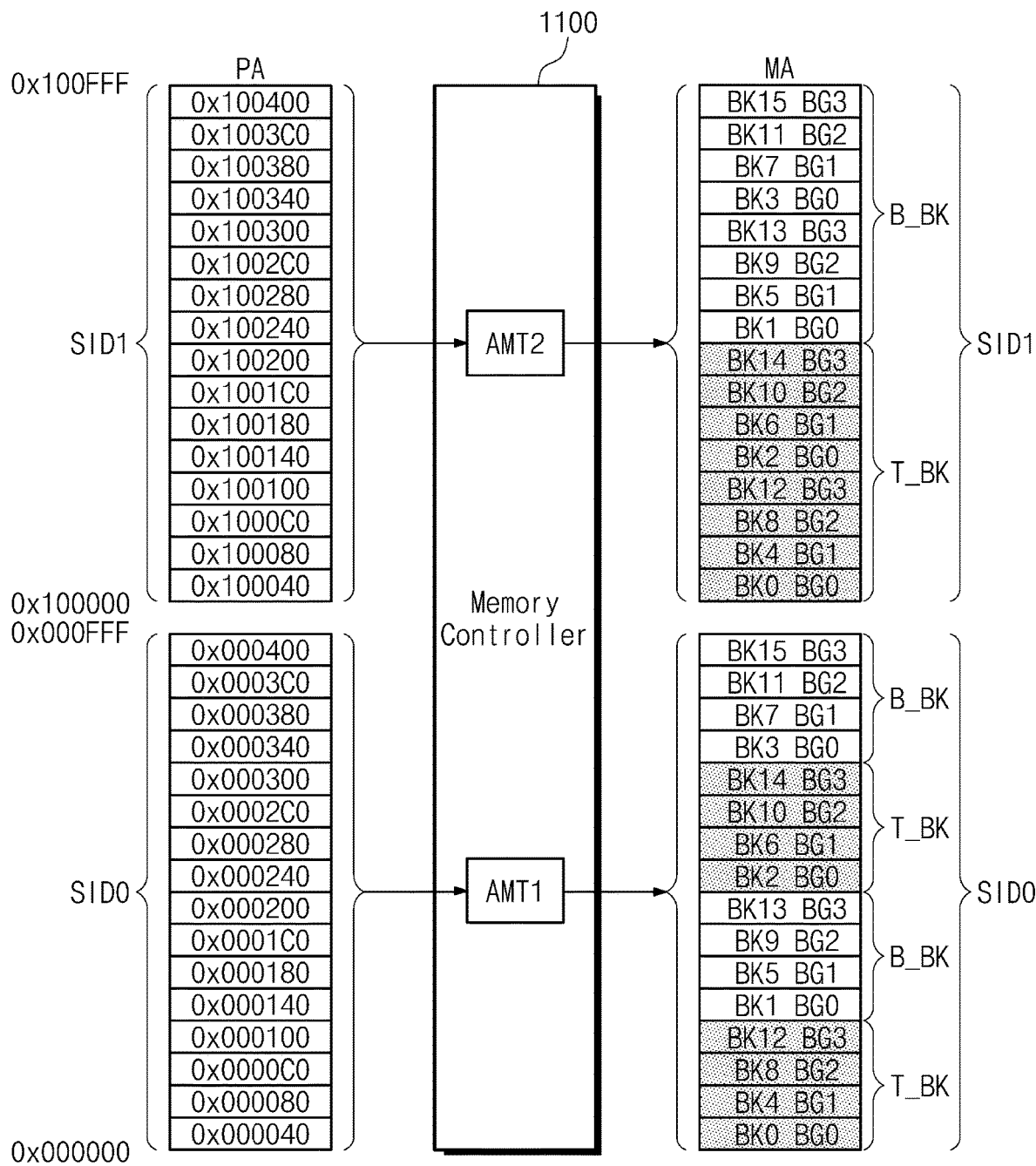
FIG. 8 illustrates an example in which a physical address is converted into a memory address by a memory controller of FIG. 5.

FIG. 8 illustrates an example in which a physical address is converted into a memory address by a memory controller of FIG. 5. The memory controller 1100 may convert the physical address PA, in which a bit corresponding to a stack identifier has a value of SID0, from among the physical addresses PA into the memory address MA based on the address mapping table AMT1. The memory controller 1100 may convert the physical address PA, in which a bit corresponding to a stack identifier has a value of SID1, from among the physical addresses PA into the memory address MA based on the address mapping table AMT2 different from the address mapping table AMT1. For example, a range of the physical addresses PA, in which a bit corresponding to a stack identifier has a value of SID0, may be from 0x000000 to 0x000FFF, and a range of the physical addresses PA, in which a bit corresponding to a stack identifier has a value of SID1, may be from 0x100000 to 0x100FFF. However, the inventive concept is not limited to the above numerical values.

According to the address mapping table AMT1, bits corresponding to the bank address BA0 to BA3 from among bits of the physical address PA of "0x000040" may be "$0000_{(2)}$". The memory controller 1100 may map the physical address PA of "0x000040" onto the bank BK0 of the bank group BG0 based on the address mapping table AMT1. For example, a difference between the physical address PA of "0x000040" and the physical address PA of "0x000080" may correspond to a size of the cache line CL (e.g., 64 bytes). According to the address mapping table AMT1, bits corresponding to the bank address BA0 to BA3 from among bits of the physical address PA of "0x000080" may be "$0100_{(2)}$". The memory controller 1100 may map the physical address PA of "0x000080" onto the bank BK4 of the bank group BG1 based on the address mapping table AMT1. As in the above description, the memory controller 1100 may convert the physical address PA, in which a bit corresponding to a stack identifier has a value of SID0, into the memory address MA based on the address mapping table AMT1. The physical address PA that sequentially increase from "0x000040" to "0x000400" may be mapped onto the banks BK0, BK4, BK8, and BK12 corresponding to a top bank T_BK, the banks BK1, BK5, BK9, and BK13 corresponding to a bottom bank B_BK, the banks BK2, BK6, BK10, and BK14 corresponding to a top bank T_BK, and the banks BK3, BK7, BK11, and BK15 corresponding to a bottom bank B_BK.

According to the address mapping table AMT2, bits corresponding to the bank address BA0 to BA3 from among bits of the physical address PA of "0x100040" may be "$0000_{(2)}$". The memory controller 1100 may map the physical address PA of "0x100040" onto the bank BK0 of the bank group BG0 based on the address mapping table AMT2. According to the address mapping table AMT2, bits corresponding to the bank address BA0 to BA3 from among bits of the physical address PA of "0x100080" may be "$0100_{(2)}$". The memory controller 1100 may map the physical address PA of "0x100080" onto the bank BK4 of the bank group BG1 based on the address mapping table AMT2. As in the above description, the memory controller 1100 may convert the physical address PA, in which a bit corresponding to a stack identifier has a value of SID1, into the memory address MA based on the address mapping table AMT2. The physical addresses PA that sequentially increase from "0x100040" to "0x100400" may be mapped onto the banks BK0, BK4, BK8, BK12, BK2, BK6, BK10, and BK14 corresponding to a top bank T_BK and the banks BK1, BK5, BK9, BK13, BK3, BK7, BK11, and BK15 corresponding to a bottom bank B_BK. The physical addresses PA that sequentially increase from "0x100040" to "0x100400" and the physical addresses PA that sequentially increase from "0x000040" to "0x000400" are changed to be identical except for the stack identifier SID0/SID1. Nevertheless, because the address mapping tables AMT1 and AMT2 are different, the order of mapping banks each corresponding to the physical address PA sequentially increasing from "0x100040" to "0x100400" is different from the order of mapping banks each corresponding to the physical address PA sequentially increasing from "0x000040" to "0x000400".

Figure 9:
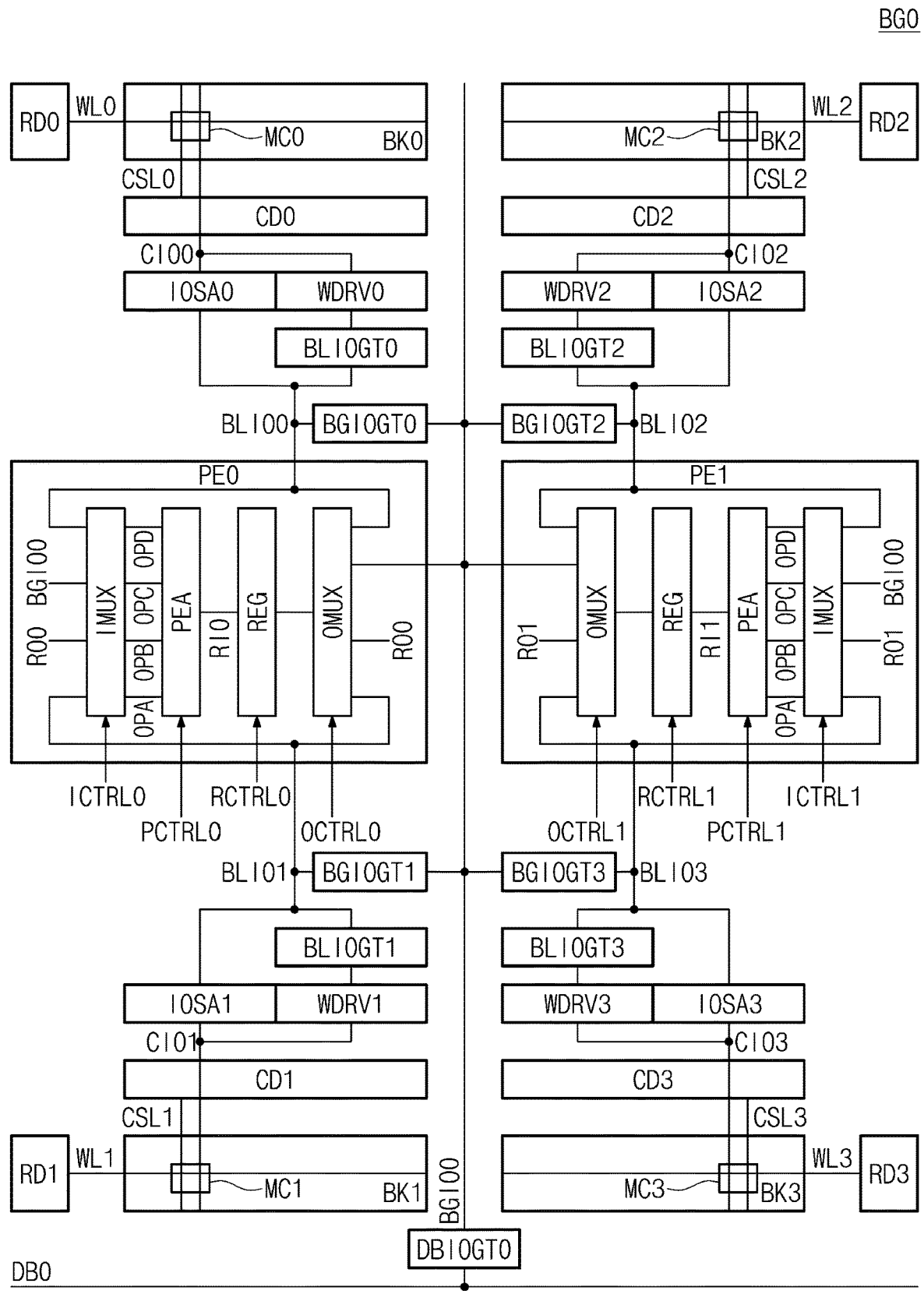
FIG. 9 illustrates a block diagram of a bank group of FIG. 6.

FIG. 9 illustrates a block diagram of a bank group of FIG. 6. Although, only bank group BG0 is illustrated in detail in FIG. 9, as described above, the remaining bank groups BG1 to BG3 may be implemented to be similarly or substantially identical to the bank group BG0.

The bank group BG0 may include a row decoder RD0 and a column decoder CD0. The row decoder RD0 may decode the row address Row of the memory address MA and may select and activate a word line WL0 of the bank BK0. For example, when the word line WL0 is activated, the bank BK0 may be in an active state. On the other hand, when the word line WL0 is inactivated the bank BK0 may be in a precharge state. As described above, state information of the bank BK0 may be stored in the bank state register 1142. The column decoder CD0 may decode the column address Column of the memory address MA and may select and activate a column selection line CSL0 of the bank BK0. The bank BK0 may include memory cells MC0 that are accessed through the word line WL0 and the column selection line CSL0. The bank BK0 may further include memory cells that are accessed through other word lines and other column selection lines.

The bank group BG0 may further include an input/output sense amplifier IOSA0, a write driver WDRV0, a bank local input/output gating circuit BLIOGT0, a bank global input/output gating circuit BGIOGT0, and a data bus input/output gating circuit DBIOGT0. The input/output sense amplifier IOSA0 may sense and amplify read data output from the memory cells MC0 through cell input/output lines CIO0 and may output the read data to bank local input/output lines BLIO0. The write driver WDRV0 may receive write data transmitted through the bank local input/output lines BLIO0 and may write the write data in the memory cells MC0 through the cell input/output lines CIO0. The bank local input/output gating circuit BLIOGT0 may electrically connect the write driver WDRV0 and the bank local input/output lines BLIO0 or may electrically disconnect the write driver WDRV0 from the bank local input/output lines BLIO0. The bank local input/output gating circuit BLIOGT0 may electrically connect the input/output sense amplifier IOSA0 and the bank local input/output lines BLIO0 or may electrically disconnect the input/output sense amplifier IOSA0 from the bank local input/output lines BLIO0. The bank global input/output gating circuit BGIOGT0 may electrically connect the bank local input/output lines BLIO0 and bank global input/output lines BGIO0 or may electrically disconnect the bank local input/output lines BLIO0 from the bank global input/output lines BGIO0. The bank global input/output lines BGIO0 may be shared by the banks BK0 to BK3 in the bank group BG0. The data bus input/output gating circuit DBIOGT0 may electrically connect the bank global input/output lines BGIO0 and the data bus DB0 or may electrically disconnect the bank global input/output lines BGIO0 from the data bus DB0. The data bus DB0 may be shared by the bank groups BG0 and BG1. For example, each of the bank local input/output gating circuit BLIOGT0, the bank global input/output gating circuit BGIOGT0, and the data bus input/output gating circuit DBIOGT0 may operate as an input/output multiplexer or switch. The components RD0, CD0, IOSA0, WDRV0, BLIOGT0, and BGIOGT0 described above may be for a data input/output of the bank BK0. As in the above description, for data inputs/outputs of the banks BK1 to BK3, the bank group BG0 may further include row decoders RD1 to RD3, column decoders CD1 to CD3, input/output sense amplifiers IOSA1 to IOSA3, write drivers WDRV1 to WDRV3, bank local input/output gating circuits BLIOGT1 to BLIOGT3, and bank global input/output gating circuits BGIOGT1 to BGIOGT3.

The PE0 may include an input multiplexer IMUX, a PE array PEA, a register REG, and an output multiplexer OMUX. The input multiplexer IMUX may receive data (or write data or read data) of the bank BK0 through the bank local input/output lines BLIO0, may receive data (or write data or read data) of the bank BK1 through bank local input/output lines BLIO1, may data of the bank group BG0 through the bank global input/output lines BGIO0, and may receive data of register output lines RO0. The input multiplexer IMUX may provide at least one of the pieces of above data to the PE array PEA based on an input control signal ICTRL0. For example, the above data may be provided to the PE array PEA as operands OPA to OPD. The PE array PEA may execute a calculation on at least one of the pieces of above data based on a processing control signal PCTRL0. For example, the calculation executable by the PE array PEA may be various arithmetic or logic operations such as addition, subtraction, multiplication, division, shift, AND, NAND, OR, NOR, XNOR, and XOR. The register REG may receive and store a calculation result of the PE array PEA through register input lines RIO based on a register control signal RCTRL0. The register REG may output the stored calculation result as data to the register output lines RO0 based on the register control signal RCTRL0. The output multiplexer OMUX may output the data stored in the register REG to at least one of the bank local input/output lines BLIO0, the bank local input/output lines BLIO1, register output lines RO0, and the bank global input/output lines BGIO0, based on an output control signal OCTRL0. A configuration and an operation of the PE1 may be substantially identical to the PE0 except that the PE1 is connected with bank local input/output lines BLIO2 and BLIO3 and receives control signals ICTRL1, PCTRL1, RCTRL1, and OCTRL1.

Figure 10:
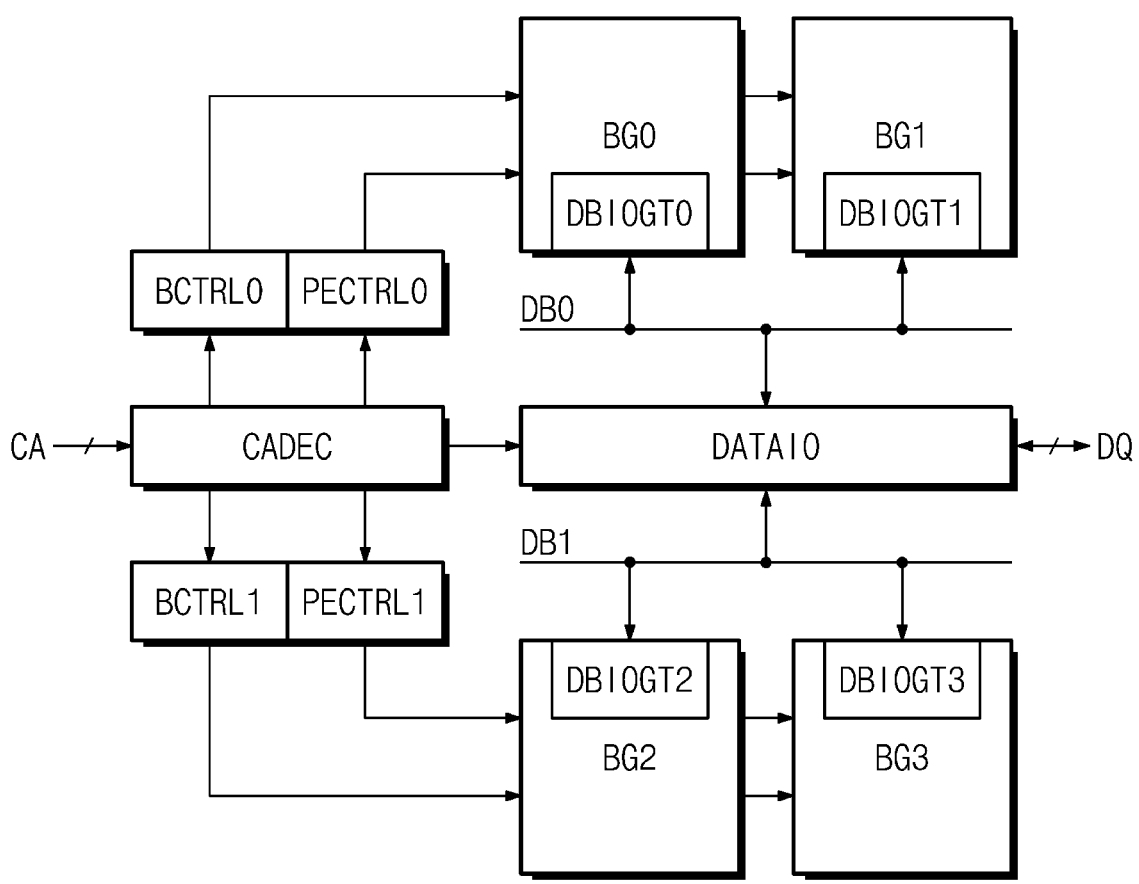
FIG. 10 illustrates a block diagram of a PIM die of FIG. 6.

FIG. 10 illustrates a block diagram of a PIM die of FIG. 6. The command and address decoder CADEC may decode the command and address signals CA and may control the bank controllers BCTRL0 and BCTRL1, the PE controllers PECTRL0 and PECTRL1, and the data input/output circuit DATAIO. The bank controller BCTRL0 may control read and write operations of memory cells of the bank groups BG0 and BG1. The bank controller BCTRL1 may control read and write operations of memory cells of the bank groups BG2 and BG3. Each of the PE controllers PECTRL0 and PECTRL1 may include a control register storing control information. The PE controller PECTRL0 may generate the control signals ICTRL0, ICTRL1, PCTRL0, PCTRL1, RCTRL0, RCTRL1, OCTRL0, and OCTRL1 to be provided to the PE0 and the PE1 of the bank group BG0 based on the control information of the control register, under control of the command and address decoder CADEC. The PE controller PECTRL0 may generate control signals to be provided to the PE2 and the PE3 of the bank group BG1 based on the control information of the control register under control of the command and address decoder CADEC. The PE controller PECTRL1 may generate control signals to be provided to the PE4 to the PE7 of the bank groups BG2 and BG3 based on the control information of the control register under control of the command and address decoder CADEC. The data input/output circuit DATAIO may output data of the data input/output signals DQ to the data buses DB0 and DB1 or may output the data input/output signals DQ including data of the data buses DB0 and DB1.

Figure 11:
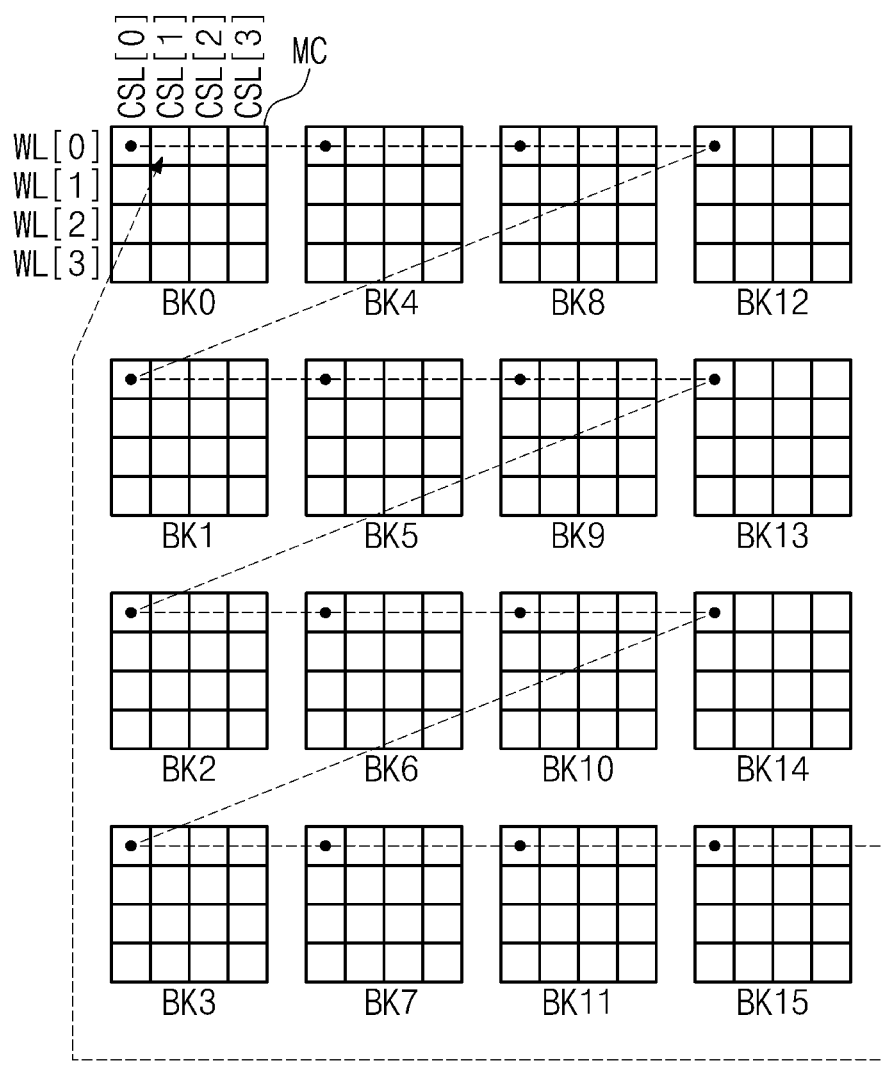
FIGS. 11 and 12 illustrate examples in which data in a PIM die are arranged according to address mapping tables.
Figure 12:
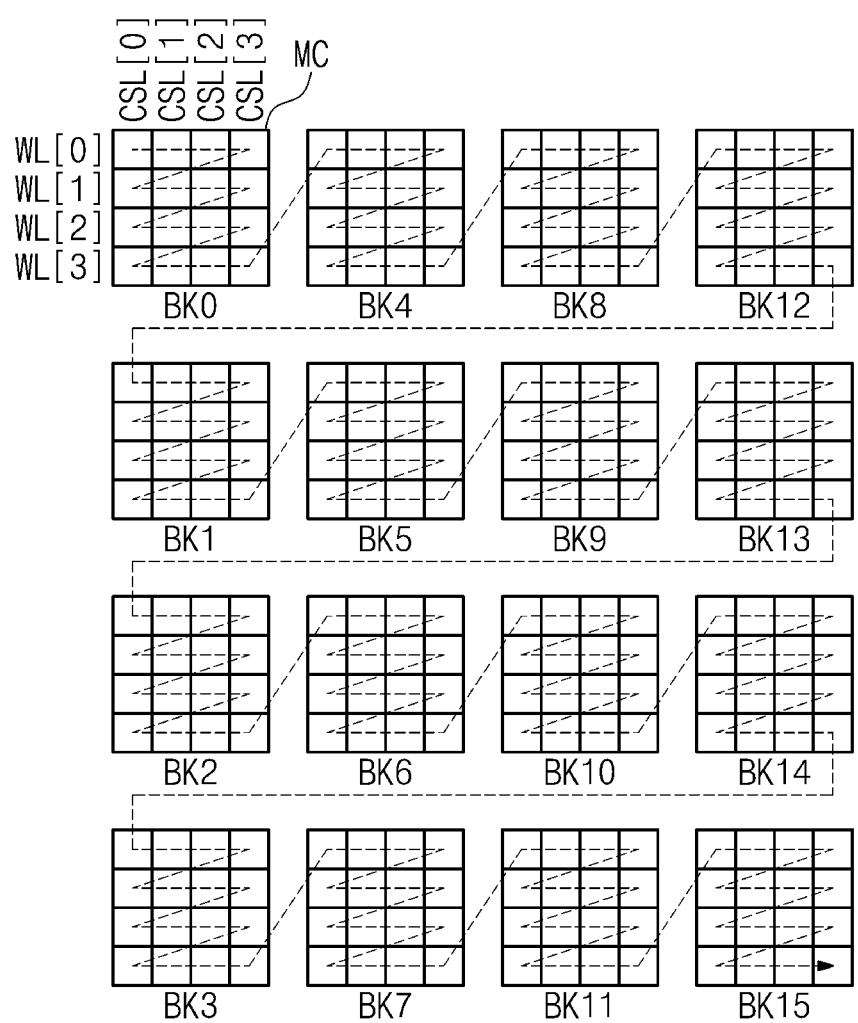

FIGS. 11 and 12 illustrate examples in which data in a PIM die are arranged according to address mapping tables of FIG. 3. In FIGS. 11 and 12, a memory request may be a write command for the memory device 2000, memory requests are input to the memory request queue 1110, the physical addresses PA of the memory requests sequentially increase from a minimum value (e.g., 0x000000 of FIG. 8) to a maximum value (e.g., 0xFFFFFF), and each of the banks BK0 to BK15 includes memory cells MC accessible through four word lines WL[0:3] and four column selection lines CSL[0:3]. However, the inventive concept is not limited to the above numerical values.

The physical address PA having the stack identifier SID0 may be converted into the memory address MA by the address mapping table AMT1. The address converter 1120 may select the address mapping table AMT1, and the PHY 1130 may access the PIM die 2100 through the channel CH1 and may activate at least one of the banks BK0 to BK15 of the PIM die 2100 based on the memory address MA. According to the address mapping table AMT1, bits of the physical address PA, which correspond to the row address Row and the column address Column correspond to upper bits above bits of the physical address PA, which correspond to the bank address BA0 to BA3. Referring to FIG. 11, data may be arranged (or written) in order of memory cells MC of the banks BK0, BK4, BK8, BK12, BK1, BK5, BK9, BK13, BK2, BK6, BK10, BK14, BK3, BK7, BK11, and BK15 selected by word lines WL[0] and column selection lines CSL[0]. Next, data may be arranged (or written) in order of memory cells MC of the banks BK0, BK4, BK8, BK12, BK1, BK5, BK9, BK13, BK2, BK6, BK10, BK14, BK3, BK7, BK11, and BK15 selected by word lines WL[0] and column selection lines CSL[1]. As the above procedure is repeated, data may be arranged in all the memory cells MC in the banks BK0 to BK15.

The physical address PA having the stack identifier SID1 may be converted into the memory address MA by the address mapping table AMT2. The address converter 1120 may select the address mapping table AMT2, and the PHY 1130 may access the PIM die 2500 through the channel CH1 and may activate at least one of the banks BK0 to BK15 of the PIM die 2500 and at least one of the PE0 to the PE7 of the PIM die 2500 based on the memory address MA. According to the address mapping table AMT2, at least one (refer to BA0 or BA1 of FIG. 3) of bits of the physical address PA, which correspond to the bank address BA0 to BA3, corresponds to bits above bits of the physical address PA, which correspond to the column address Column. Referring to FIG. 12, data may be written or arranged in the memory cells MC of the bank BK0 selected by the word line WL[0] and the column selection line CSL[0]. Next, data may be written or arranged in the memory cells MC of the bank BK0 selected by the word line WL[0] and the column selection line CSL[1]. As the above procedure is repeated, data may be written or arranged in the memory cells MC of the bank BK0 selected by the word line WL[0]. As in the case where data are arranged in order of memory cells MC of the bank BK0 selected by the word line WL[0] and column selection lines CSL[0:3], data may be arranged in order of the memory cells MC of the banks BK4, BK8, BK12, BK2, BK6, BK10, BK14, BK1, BK3, BK5, BK7, BK9, BK11, BK13, and BK15 selected by word lines WL[0] and the column selection lines CSL[0:3]. After data are arranged in the memory cells MC of all the banks BK0 to BK15 selected by the word line WL[0], as in the above description, data may be are arranged in the memory cells MC of all the banks BK0 to BK15 selected by word lines WL[1:3]. Unlike the data arrangement according to the address mapping table AMT1 of FIG. 11, in the case of the data arrangement according to the address mapping table AMT2 of FIG. 12, after data are completely arranged in the memory cells MC selected by one word line WL[0], the arrangement of data in the memory cells MC selected by the word lines WL[1:3] may be initiated.

FIG. 13 illustrates an example of calculations executed by PEs according to data arrangement of FIG. 12. For example, vector A may be arranged in the banks BK0, BK4, BK8, BK12, BK2, BK6, BK10, and BK14 corresponding to the top bank T_BK, and vector B may be arranged in the banks BK1, BK5, BK9, BK13, BK3, BK7, BK11, and BK15 corresponding to the bottom bank B_BK. The PE0 to the PE7 may generate vector C by executing addition on vector A arranged in the banks BK0, BK4, BK8, BK12, BK2, BK6, BK10, and BK14 corresponding to the top bank T_BK and vector B arranged in the banks BK1, BK5, BK9, BK13, BK3, BK7, BK11, and BK15 corresponding to the bottom bank B_BK. Any other calculations may be executed instead of the addition. Vector C may be stored in the registers REG of the PE0 to the PE7. Referring to FIG. 13, because each of the PE0 to the PE7 is shared by two banks, in that the PE0 to the PE7 execute calculations, a way to arrange data in all the memory cells MC selected by one word line depending on the address mapping table AMT2 may be more advantageous than a way to arrange data in the memory cells MC depending on the address mapping table AMT1. For example, the memory controller 1100 may apply the address mapping table AMT1 to the PIM die 2100 and the address mapping table AMT2 to the PIM die 2500, independently of each other. Accordingly, in the case where the processor 1200 executes PIM calculations by using the PE0 to the PE7 of the PIM die 2500, the memory controller 1100 may apply the address mapping table AMT1 to the PIM die 2100 and the address mapping table AMT2 to the PIM die 2500 independently of each other, instead of applying the address mapping table AMT2 to the PIM dies 2100 and 2500 in common, thus preventing the reduction in performance of a normal operation of the processor 1200, which is executed by using the PIM die 2100 in which the PE0 to the PE7 are not activated. The normal operation may include data input/output operations of the PIM die 2100 according to a read command or a write command without the execution of the PE0 to the PE7. Also, because the memory controller 1100 supports the different address mapping tables AMT1 and AMT2, the overhead that a program executable by the processor 1200 rearrange data in the case of executing a PIM calculation using the PE0 to the PE7 of the PIM die 2500 may be reduced, and parallelizing of a bank level may be utilized in the normal operation.

Figure 14:
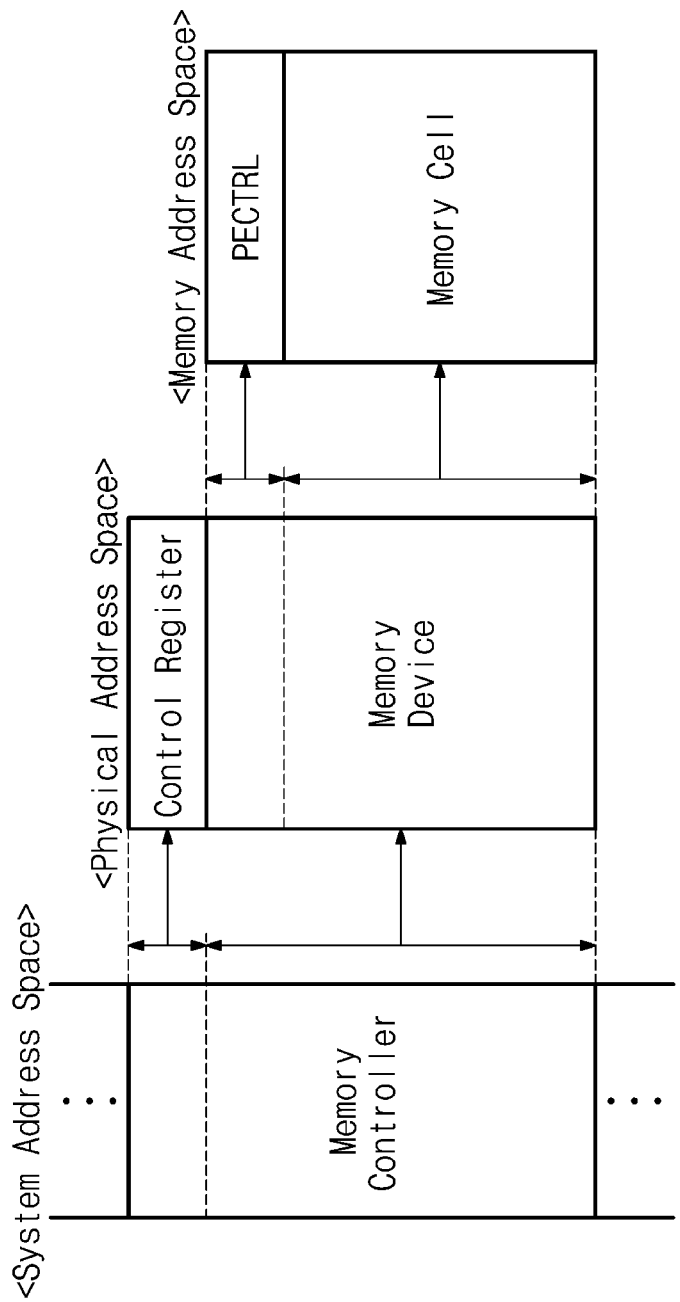
FIG. 14 illustrates an example in which a processor of FIG. 5 accesses a memory controller and a memory controller accesses a memory device.

FIG. 14 illustrates an example in which a processor of FIG. 5 accesses a memory controller and a memory controller accesses a memory device. For example, the processor 1200 may access the memory controller 1100 in a memory mapped I/O (MMIO) manner. A system address space (or area) may include a space allocated to the memory controller 1100. According to an example embodiment, the system address space may further include spaces (or areas) respectively allocated to any other components (e.g., the on-chip memory 1300, intellectual property (IP) blocks, and controllers) in the system on chip 1000. The processor 1200 may access and control the memory controller 1100 and any other components in the system on chip 1000 by using the same system address space. The processor 1200 may access a space allocated to the memory controller 1100 from among the system address space and may write a value in the space allocated to the memory controller 1100 by using a write instruction. The memory controller 1100 may respond to the value and, for example, may receive a memory request of the processor 1200. The memory controller 1100 may ignore a value written in the remaining space other than the space allocated to the memory controller 1100 from among the system address space.

The space allocated to the memory controller 1100 from among the system address space may be a physical address space, may correspond to the physical address space, or may be mapped onto the physical address space. The physical address space may correspond to a range of the physical addresses PA associated with a memory request. The physical address space may include a space allocated to the control register 1141 and a space allocated to the memory device 2000. The space allocated to the memory controller 1100 from among the system address space may include a space corresponding to the space allocated to the control register 1141 from among the physical address space, and the processor 1200 may change a value (or information) of the control register 1141 by accessing the space corresponding to the space allocated to the control register 1141. As in the above description, the space allocated to the memory controller 1100 from among the system address space may include a space corresponding to the space allocated to the memory device 2000 from among the physical address space, and the processor 1200 may access the memory device 2000 by accessing the space corresponding to the space allocated to the memory device 2000.

The memory controller 1100 may also access the memory device 2000 in the MMIO manner. The physical address space may include the space allocated to the memory device 2000. The memory controller 1100 may access the space allocated to the memory device 2000 from among the physical address space and may convert the physical address PA of the space allocated to the memory device 2000 from among the physical address space into the memory address MA.

The space allocated to the memory device 2000 from among the physical address space may be a memory address space, may correspond to the memory address space, or may be mapped onto the memory address space. The memory address space may correspond to a range of the memory addresses MA. The memory address space may include a space allocated to control registers of the PE controllers PECTRL0 and PECTRL1 and a space allocated to memory cells. The space allocated to the memory device 2000 from among the physical address space may include a space corresponding to the space allocated to the control registers of the PE controllers PECTRL0 and PECTRL1 from among the memory address space, and the memory controller 1100 may change a value (or information) of the control registers of the PE controllers PECTRL0 and PECTRL1 by accessing the space corresponding to the space allocated to the control registers of the PE controllers PECTRL0 and PECTRL1. As in the above description, the space allocated to the memory device 2000 from among the physical address space may include a space corresponding to the space allocated to the memory cells from among the memory address space, and the memory controller 1100 may access the memory cells by accessing the space corresponding to the space allocated to the memory cells. Memory cells of each of the banks BK0 to BK15 of each of the PIM dies 2100 to 2800 of the memory device 2000 and the control registers of the PE controllers PECTRL0 and PECTRL1 all may be mapped onto a memory address associated with each of the PIM dies 2100 to 2800 of the memory device 2000.

Figure 15:
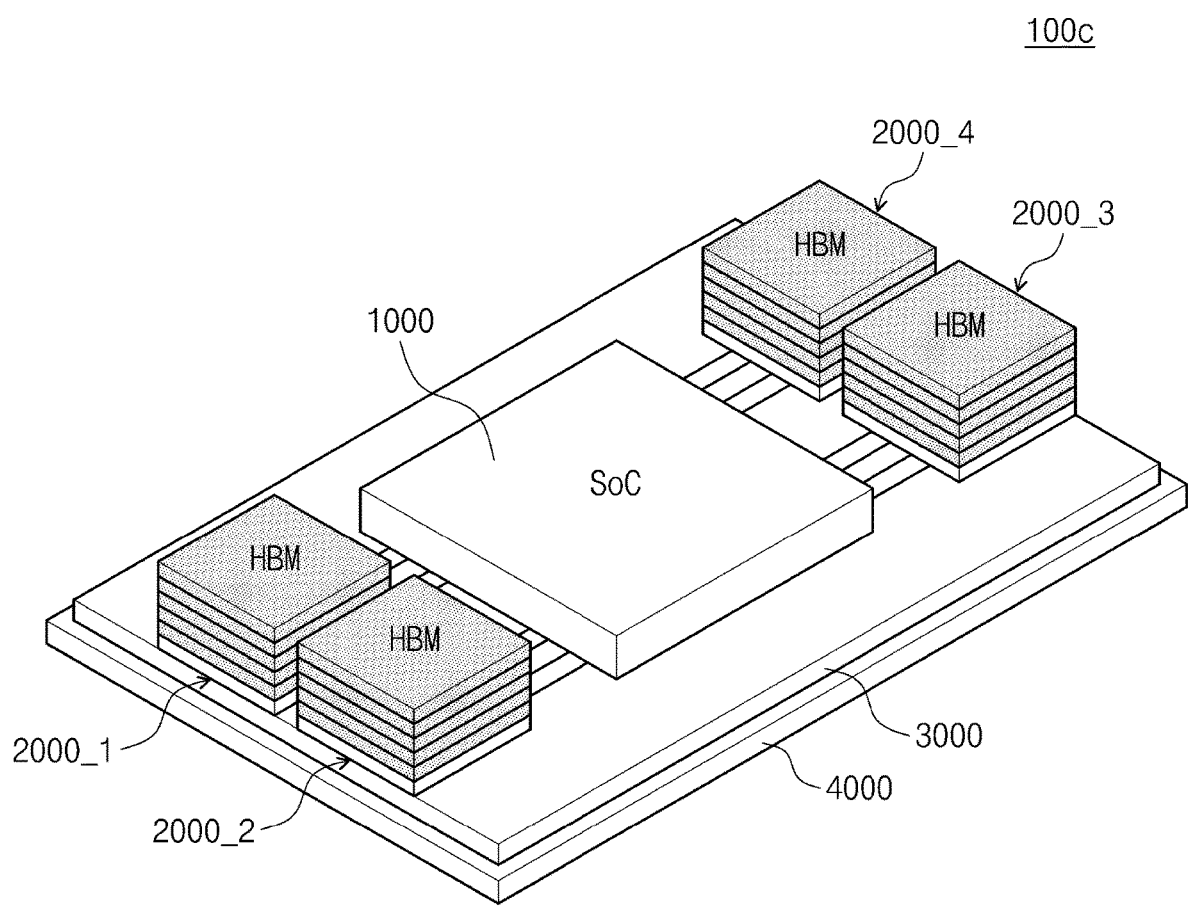
FIG. 15 illustrates an electronic device according to another example embodiment of the inventive concept.

FIG. 15 illustrates an electronic device 100c according to another embodiment of the inventive concept. The electronic device 100c may include the system on chip 1000, memory devices 2000_1 to 2000_4, the interposer 3000, and a package board 4000. Each of the memory devices 2000_1 to 2000_4 may correspond to the memory device 2000 described above, and the number of memory devices 2000_1 to 2000_4 is not limited to the example illustrated in FIG. 15. The interposer 3000 may include paths of a plurality of channels that allow the system on chip 1000 to access the memory devices 2000_1 to 2000_4. For example, the interposer 3000 may be stacked on the package board 4000. For another example, the system on chip 1000 and the memory devices 2000_1 to 2000_4 may be stacked on the package board 4000 without the interposer 3000.

A memory controller according to an embodiment of the inventive concept may simultaneously support a plurality of address mapping tables for converting a physical address into a memory address. The memory controller may dynamically select the plurality of address mapping tables depending on whether to execute a PE of a PIM die and may optimally arrange data to be appropriate for the execution of the PE.

At least one of the components, elements, modules or units (collectively "components" in this paragraph) represented by a block in the drawings, such as the processor and the memory controller, may be embodied as various numbers of hardware, software and/or firmware structures that execute respective functions described above, according to an exemplary embodiment. For example, at least one of these components may use a direct circuit structure, such as a memory, a hardware processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:
1. A memory controller comprising:
a first address mapping table and a second address mapping table;
a memory request queue configured to store a memory request associated with a memory device including a first memory die and a second memory die having a shared channel;
an address converter configured to select one of the first address mapping table and the second address mapping table based on a bit of a physical address of the memory request and to convert the physical address into a memory address for the first memory die and the second memory die based on the selected one of the first address mapping table and the second address mapping table; and
a physical layer configured to transmit the memory address to the memory device through the shared channel,
wherein the first address mapping table has a first mapping different from a second mapping of the second address mapping table, and
wherein the first memory die is a memory die that does not include a processing element (PE), and the second memory die is a processing in memory (PIM) die that includes a PE.
2. The memory controller of claim 1, wherein the bit of the physical address of the memory request corresponds to a stack identifier, which identifies the first memory die and the second memory die.

3. The memory controller of claim 2, wherein the bit of the physical address of the memory request is a most significant bit.

4. The memory controller of claim 1, wherein each of the first memory die and the second memory die comprises a plurality of banks which are identified by a bank address of the memory address, and
wherein first locations of a first group of bits, among a plurality of bits, in the physical address, which are converted into the bank address of the memory address by the first address mapping table, are different from second locations of a second group of bits, among the plurality of bits, in the physical address, which are converted into the bank address of the memory address by the second address mapping table.

5. The memory controller of claim 4, wherein the memory address includes the bank address, and a row address and a column address, which identifies memory cells of each of the plurality of banks, and
wherein at least one of the second group of bits of the physical address, which are converted into the bank address of the memory address by the second address mapping table, corresponds to an upper bit of the plurality of bits of the physical address, which are converted into the column address of the memory address by the second address mapping table.

6. The memory controller of claim 1, wherein the address converter is further configured to select the first address mapping table, and
wherein the physical layer is further configured to access the first memory die through the shared channel based on the memory address and activate at least one of a plurality of banks of the first memory die.

7. The memory controller of claim 1, wherein the address converter is further configured to select the second address mapping table, and
wherein the physical layer is further configure to access the second memory die through the shared channel based on the memory address and activate at least one of plurality of banks of the second memory die and the PE of the second memory die.

8. The memory controller of claim 1, wherein the address converter comprises:
an address range register configured to store the bit of the physical address of the memory request;
a first address converting circuit configured to convert the physical address into the memory address based on the first address mapping table;
a second address converting circuit configured to convert the physical address into the memory address based on the second address mapping table; and
a mapping selecting circuit configured to select one of the first address converting circuit and the second address converting circuit based on a value of the bit stored in the address range register.

9. The memory controller of claim 1, further comprising:
a memory command queue configured to store a memory command associated with the memory request and the memory address;
a bank state register configured to store pieces of state information of a plurality of banks of each of the first memory die and the second memory die;
a command scheduler configured to adjust an order of processing the memory command and the memory address stored in the memory command queue based on the pieces of state information of the plurality of banks;
a command sequencer configured to output the memory command and the memory address to the physical layer based on the order;
a system bus interface circuit configured to receive the memory request through a system bus and to provide the memory request to the memory request queue;
a read buffer configured to store read data transmitted from the memory device; and
a write buffer configured to store write data to be transmitted to the memory device.

10. A system on chip comprising:
a processor configured to generate a memory request; and
a memory controller comprising a first address mapping table and a second address mapping table, the memory controller configured to:
select one of the first address mapping table and the second address mapping table based on a bit of a physical address of the memory request;
convert the physical address into a memory address of a memory device based on the selected one of the first address mapping table and the second address mapping table; and
access one of a first memory die or a second memory die through a shared channel based on the memory address,
wherein the first address mapping table has a first mapping different from a second mapping of the second address mapping table, and
wherein the first memory die is a memory die that does not include a processing element (PE), and the second memory die is a processing in memory (PIM) die that includes a PE.

11. The system on chip of claim 10, wherein each of the first memory die and the second memory die comprises a plurality of banks, and each of the plurality of banks including a plurality of memory cells, and
wherein the memory address includes a stack identifier, which identifies the first memory die and the second memory die, a bank address, which the plurality of banks, and a row address and a column address, which identifies the plurality of memory cells of each of the plurality of banks.

12. The system on chip of claim 11, wherein the memory controller is further configured to:
convert a first bit of the physical address, which is the bit of the physical address of the memory request, into the stack identifier;
convert second bits of the physical address into the bank address;
convert third bits of the physical address into the row address; and
convert fourth bits of the physical address into the column address.

13. The system on chip of claim 12, wherein the first bit is a most significant bit of the physical address.

14. The system on chip of claim 12, wherein locations in the physical address, at which the second bits are located, are changed based on the first address mapping table and the second address mapping table.

15. The system on chip of claim 12, wherein, in the first address mapping table, the second bits correspond to lower bits of the fourth bits, and
wherein, in the second address mapping table, at least one of the second bits correspond to an upper bit of the fourth bits.

16. The system on chip of claim 12, wherein lower bits of the physical address, which are placed below the first to the fourth bits, correspond to a cache line.

17. The system on chip of claim 10, wherein the memory controller comprises an address converter, and
wherein the address converter comprises:
an address range register configured to store the bit of the physical address of the memory request;
a first address converting circuit configured to convert the physical address into the memory address based on the first address mapping table;
a second address converting circuit configured to convert the physical address into the memory address based on the second address mapping table; and
a mapping selecting circuit configured to select one of the first address converting circuit and the second address converting circuit based on a value of the bit stored in the address range register.

18. An electronic device comprising:
a memory device comprising a first memory die, a second memory die, and a shared channel for the first memory die and the second memory die; and
a system on chip comprising:
a processor configured to generate a memory request; and
a memory controller configured to:
select one of a first address mapping table and a second address mapping table, included within the controller, based on a bit of a physical address of the memory request;
convert the physical address into a memory address of the memory device based on the selected one of the first address mapping table and the second address mapping table, and
access one of the first memory die and the second memory die through the shared channel based on the memory address,
wherein the first address mapping table has a first mapping different from a second mapping of the second address mapping table, and
wherein the first memory die is a memory die that does not include a processing element (PE), and the second memory die is a processing in memory (PIM) die that includes a PE.

19. The electronic device of claim 18, wherein the first memory die is different from the second memory die, and
wherein the second memory die comprises a plurality of first banks, and the first memory die comprises a plurality of second banks.

20. The memory controller of claim 1, wherein a plurality of address mapping tables are stored in the memory controller, and
wherein the plurality of address mapping tables comprises the first address mapping table and the second address mapping table.

21. The memory controller of claim 1, wherein the physical address having a first stack identifier is converted into the memory address by the first address mapping table, and
wherein the physical address having a second stack identifier is converted into the memory address by the second address mapping table.

* * * * *